United States Patent
Karino et al.

(10) Patent No.: US 8,458,338 B2
(45) Date of Patent: Jun. 4, 2013

(54) ADDRESS TRANSLATION DEVICE AND ADDRESS TRANSLATION METHOD

(75) Inventors: Shuichi Karino, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 417 days.

(21) Appl. No.: 12/602,545

(22) PCT Filed: Jun. 11, 2008

(86) PCT No.: PCT/JP2008/061078
§ 371 (c)(1),
(2), (4) Date: Dec. 1, 2009

(87) PCT Pub. No.: WO2008/153193
PCT Pub. Date: Dec. 18, 2008

(65) Prior Publication Data
US 2010/0175123 A1    Jul. 8, 2010

(30) Foreign Application Priority Data

Jun. 15, 2007    (JP) .................................. 2007-158477

(51) Int. Cl.
*G06F 15/16*    (2006.01)

(52) U.S. Cl.
USPC ........................................................ 709/227

(58) Field of Classification Search
USPC ............................................... 709/227–229
See application file for complete search history.

(56) References Cited

U.S. PATENT DOCUMENTS

| | | | | |
|---|---|---|---|---|
| 6,496,567 | B1 * | 12/2002 | Bjornberg et al. ......... | 379/88.02 |
| 6,934,263 | B1 * | 8/2005 | Seaman ........................ | 370/256 |
| 7,016,363 | B1 * | 3/2006 | Reed et al. .................... | 370/404 |
| 7,203,762 | B2 * | 4/2007 | Yamada et al. ............... | 709/238 |
| 7,227,872 | B1 * | 6/2007 | Biswas et al. ................. | 370/465 |
| 7,290,283 | B2 * | 10/2007 | Copeland, III ................. | 726/25 |
| 7,424,018 | B2 * | 9/2008 | Gallatin et al. ............... | 370/389 |
| 7,436,832 | B2 * | 10/2008 | Gallatin et al. ............... | 370/389 |
| 7,440,467 | B2 * | 10/2008 | Gallatin et al. ............... | 370/401 |
| 7,542,473 | B2 * | 6/2009 | Beshai ........................ | 370/395.4 |

(Continued)

FOREIGN PATENT DOCUMENTS

JP    11-150566 A    6/1999
JP    2004259225 A    9/2004

(Continued)

OTHER PUBLICATIONS

International Search Report for PCT/JP2008/061078 mailed Sep. 16, 2008.

*Primary Examiner* — Alicia Baturay

(57) ABSTRACT

In order to more efficiently use port resources, which are finite global address resources assigned to an address translation device, the address translation device holds a session-port assignment table showing a correspondence between an existing session and a local endpoint (port resource) in the address translation device, and a port assignment rule indicating port usage about assignable ports. An address translation unit translates address information of a packet received according to the correspondence between the existing session and the port resource shown in the session-port assignment table, and assigns the port according to the port usage indicated by the port assignment rule for a packet for opening a new session. An assignment rule update unit changes a ratio of the port usage in the port assignment rule while the correspondence between the existing session and the port resource in the session-port assignment table is not changed.

11 Claims, 15 Drawing Sheets

U.S. PATENT DOCUMENTS

| | | | |
|---|---|---|---|
| 7,644,151 B2 * | 1/2010 | Jerrim et al. | 709/224 |
| 7,653,047 B2 * | 1/2010 | Lee | 370/352 |
| 7,769,994 B2 * | 8/2010 | Peles | 713/153 |
| 7,784,096 B2 * | 8/2010 | Kaniyar et al. | 726/23 |
| 7,835,358 B2 * | 11/2010 | Gallatin et al. | 370/390 |
| 7,886,358 B2 * | 2/2011 | Copeland, III | 726/23 |
| 7,930,423 B2 * | 4/2011 | Tundlam et al. | 709/238 |
| 2002/0198850 A1 * | 12/2002 | Grande et al. | 705/400 |
| 2003/0035371 A1 * | 2/2003 | Reed et al. | 370/230 |
| 2003/0202517 A1 * | 10/2003 | Kobayakawa et al. | 370/395.4 |
| 2003/0214960 A1 * | 11/2003 | Oh et al. | 370/401 |
| 2004/0015408 A1 * | 1/2004 | Rauen et al. | 705/26 |
| 2005/0050362 A1 * | 3/2005 | Peles | 713/201 |
| 2005/0080923 A1 * | 4/2005 | Elzur | 709/238 |
| 2005/0254490 A1 * | 11/2005 | Gallatin et al. | 370/389 |
| 2005/0265248 A1 * | 12/2005 | Gallatin et al. | 370/250 |
| 2005/0265364 A1 * | 12/2005 | Gallatin et al. | 370/401 |
| 2005/0271065 A1 * | 12/2005 | Gallatin et al. | 370/401 |
| 2006/0107322 A1 * | 5/2006 | Kaniyar et al. | 726/23 |
| 2006/0182100 A1 * | 8/2006 | Li et al. | 370/389 |
| 2007/0019540 A1 * | 1/2007 | Biswas et al. | 370/217 |
| 2007/0036163 A1 * | 2/2007 | DiBiasio et al. | 370/395.4 |
| 2007/0058642 A1 * | 3/2007 | Eisink | 370/401 |
| 2007/0079103 A1 * | 4/2007 | Mimatsu | 711/173 |
| 2007/0127396 A1 * | 6/2007 | Jain et al. | 370/254 |
| 2007/0192507 A1 * | 8/2007 | DiBiasio et al. | 709/238 |
| 2007/0280128 A1 * | 12/2007 | Okano | 370/252 |
| 2008/0232809 A1 * | 9/2008 | Beshai et al. | 398/98 |
| 2009/0064307 A1 * | 3/2009 | Holar et al. | 726/12 |
| 2009/0113203 A1 * | 4/2009 | Tsuge et al. | 713/151 |
| 2009/0279549 A1 * | 11/2009 | Ramanathan et al. | 370/395.4 |
| 2009/0279564 A1 * | 11/2009 | Li | 370/433 |
| 2010/0161827 A1 * | 6/2010 | Griesmer et al. | 709/232 |
| 2010/0175123 A1 * | 7/2010 | Karino et al. | 726/12 |
| 2011/0161500 A1 * | 6/2011 | Yengalasetti et al. | 709/227 |
| 2011/0185039 A1 * | 7/2011 | Ueno et al. | 709/217 |
| 2011/0231935 A1 * | 9/2011 | Gula et al. | 726/25 |
| 2011/0276594 A1 * | 11/2011 | Chong et al. | 707/769 |
| 2011/0307541 A1 * | 12/2011 | Walsh et al. | 709/203 |
| 2012/0030285 A1 * | 2/2012 | Kudo | 709/204 |
| 2012/0124210 A1 * | 5/2012 | Mass et al. | 709/225 |

FOREIGN PATENT DOCUMENTS

| | | |
|---|---|---|
| JP | 2005286600 A | 10/2005 |
| JP | 2006094038 A | 4/2006 |
| JP | 2006319384 A | 11/2006 |

* cited by examiner

```
ASSIGNMENT CHANGE INSTRUCTION
```

TIME OF CHANGE
0:00
1:00
2:00
3:00
...
22:00
23:00

ASSIGNMENT OF PORTS FOR LISTENING IN 0:00-1:00
  [PORT NUMBER], [RELAY DESTINATION]
  [1], [10.1.0.1:80]
  [2], [10.50.243.2:443]
  [4], [10.193.3.194.2401]
  ...
  [60134], [10.81.59.193:22]
    ※REMAINING PORT NUMBERS ARE FOR SENDING

ASSIGNMENT OF PORTS FOR LISTENING IN 1:00-2:00
  ...
  ...

ASSIGNMENT OF PORTS FOR LISTENING IN 2:00-3:00
  ...
  ...

ASSIGNMENT OF PORTS FOR LISTENING IN 23:00-0:00 OF NEXT DAY
  ...
  ...

FIG. 6

ADDRESS TRANSLATION DEVICE AND ADDRESS TRANSLATION METHOD

The present application is the National Phase of PCT/JP2008061078, filed Jun. 11, 2008, which claims a priority based on Japanese Patent Application No. 2007-158477 filed on Jun. 15, 2007, and incorporates herein the entirety of disclosure thereof.

TECHNICAL FIELD

This invention relates to a communication device for a packet exchange network such as a gateway device, and more particularly, to an address translation device for interconnection between networks respectively having different address spaces, an address translation system, and a control method and a control program therefor.

BACKGROUND ART

As illustrated in FIG. 14, the TCP/IP network has been, on its early stage, constructed such that all host nodes have global addresses, and can mutually reach each other. Hereinafter, such a mutually reachable network as mentioned above is referred to as global network.

However, in recent years, in view of restraint of consumption of the IP addresses and the like, various organizations have built own TCP/IP networks utilizing private address spaces. Hereinafter, such a network built using a private address space as mentioned above is referred to as private network.

FIG. 15 is an explanatory diagram illustrating a configuration example of an interconnection between a private network and a global network. As illustrated in FIG. 15, in order to connect the private network and the global network with each other, address translations such as network address translator (NAT), network address and port translator (NAPT), transport relay based on SOCKS (RFC 1928), application level gateway (ALG) such as an HTTP proxy server are used. Hereinafter, such devices for translating addresses for mutually connecting networks having different address spaces are generally referred to as address translation device.

Incidentally, the Internet has recently become widely used, and hence the consumption of the global IP addresses has rapidly increased. The number of the global IP addresses is limited. Hence, it is anticipated that, in the near future, all the global IP addresses will be assigned, and the global addresses will be exhausted.

When the above-mentioned state arises, for connecting a new host node to a TCP/IP network, it is only possible to connect the host node to the above-mentioned private network, to assign a private address to the host node, and to cause the host node to perform communication, via an address translation device, with devices in the global network and other private networks.

Moreover, even if the global addresses are not yet exhausted, when host nodes to be connected increase while the consumption of the global addresses is restrained, the sizes of private networks increase accordingly, and the number of host nodes in a private network per global IP address assigned to the address translation device increases (refer to FIG. 16).

When this state progresses, it is anticipated next that exhaustion of port numbers used by protocols in the transport layer such as TCP and UDP poses a problem.

Port numbers of major protocols in the transport layer (TCP, UDP, SCTP, and DCCP) are data of 16 bits in length, and hence count approximately 65 thousand. According to the NAPT and the ALG, even when one global address is used, by individually assigning a port number to a host node on the private network side, a large number of host nodes in the private network can simultaneously communicate with the global network.

According to the NAPT and the ALG, the assignment of the port number is carried out in the following way, for example. Methods of assignment depend on the direction of the communication, and the assignment is carried out respectively for "sending" used for establishing connection to a specified party, and "listening" used for accepting connection from an unspecified party to an own specific port. The connection partner for this connection is usually identified by a combination of an address and a port number of a corresponding node. Hereinafter, the destination of the connection identified by the combination of the address and the port number is referred to as endpoint of connection.

For listening, connections from unspecified connection sources are accepted, and hence the port number is occupied for all corresponding endpoints (refer to FIG. 17). In FIG. 17, for example, a port 80 used for listening for a global network is occupied by a host node 2-1 in a private network. On the other hand, for sending, it is only necessary to assign a port number to an endpoint of a specific connection destination, and the same port number can be used for other connections for different endpoints (refer to FIG. 18). In FIG. 18, for example, a port 49153 used for sending from a private network is used in common by host nodes 2-1, 2-2, and 2-3 in a private network respectively communicating with different host nodes 1-2, 1-3, and 1-4 in the global network. Therefore, the resources of the port numbers are generally consumed more for listening than for sending.

Moreover, according to the transport relay, the NAPT, and the like, a port for listening also serves to relay connections from unspecified corresponding endpoints. Moreover, a port for sending serves to assign a specific port number to sending from an endpoint of an unspecified host in a private network, thereby relaying the sending to a global network side. Thus, these methods for assigning ports are the same as the methods mentioned above.

On this occasion, when the number of host nodes for listening in the private network increases, ports in an address translation device may be exhausted for listening. When the ports in the address translation device are exhausted for listening, the sending from the private network side becomes no longer available.

Usually, by assigning ports for listening while a certain number of free ports are reserved for sending, the status in which the sending becomes impossible is prevented.

It should be noted that, relating to the technology for using ports of an address translation device, for example, Patent Document 1 describes that a stream server apparatus provided in a LAN holds an address management table containing real port information representing information on ports (discrimination between a static port and a dynamic port, and available port numbers) prepared by a NAS device for transmission/reception of protocol packets.

Moreover, Patent Document 2 describes that, in order to efficiently acquire a listening port number, by using an uniquely assigned own identification information and a common function, a listening port number is set, and a listening port number is reset by acquiring a common function out of a plurality of common functions in every certain period.

Patent Document 1: Japanese Unexamined Patent Application Publication (JPA) No. 2004-259225 (paragraphs 0115-0125 and FIG. 9)

Patent Document 2: Japanese Unexamined Patent Application Publication (JPA) No. 2006-319384 (paragraphs 0011 and 0017)

DISCLOSURE OF THE INVENTION

Problems to be Solved by the Invention

In an address translation device such as a NAPT device, as described in Patent Document 1, the discrimination between static ports always assigned for listening and dynamic ports to be assigned according to necessity corresponds to a control method of the assignment commonly carried out. This setting of usages is manually carried out, and it is considered that the frequency of the setting change is not so high. Thus, a countermeasure against influence of the change in setting on existing sessions in the address translation device is not considered. However, as mentioned above, under a condition in which finite port resources assigned to an address translation device (namely, resources to serve as connection endpoints in the global network) are possibly exhausted, it is inefficient to reserve a certain amount of the port resources for sending in a fixed manner considering a large fluctuation in frequency of the sending. Thus, when a ratio in the port usages is optimized in order to efficiently use the port resources, the setting of the port usages may be changed frequently. However, with the discrimination between the static ports and the dynamic ports as described in Patent Document 1 alone, it is impossible to protect existing sessions when an operation is carried out while the setting of the port usages is frequently changed.

Though Patent Document 2 describes that the port numbers are reset in every certain period, a purpose of this is to eliminate necessity of a port number introduction server, to enhance security, and to more efficiently acquire a listening port number, and efficient use of the finite port resources in the address translation device is not considered. In other words, port numbers assigned to respective nodes change simply in the course of time, listening port numbers are still always assigned to the respective nodes, and hence efficient use of the finite port resources is not intended.

It is therefore an object of this invention to provide an address translation device capable of, even for connection to a large-scale private network, more efficiently using port resources, which are finite global address resources assigned to the address translation device.

Means to Solve the Problems

An address translation device according to this invention is an address translation device disposed on a boundary between a private network and a global network respectively having different address spaces, and mutually connecting the private network and the global network, the address translation device including a port assignment rule storage unit for storing a port assignment rule indicating port resources represented by global addresses, which can be assigned by the address translation device, while the port resources are divided into port resources for sending from the private network and port resources for listening from the global network; a session-port assignment table storage unit for storing a session-port assignment table showing a correspondence between information indicating an existing session and information indicating the port resource represented by the global address assigned to a session endpoint of the existing session on a side of the private network; an address translation unit for translating address information of a packet received according to the correspondence between the existing session and the port resource registered in the session-port assignment table, and assigning, when a packet for opening a new session, which is not registered in the session-port assignment table, is received, the port resource to the new session according to a port usage indicated by the port assignment rule; and a port usage ratio changing unit for changing a ratio between a number of assigned ports for sending and a number of assigned ports for listening according to predetermined procedures.

Further, a control method according to this invention is a control method for a device disposed on a boundary between a private network and a global network respectively having different address spaces, and mutually connecting the private network and the global network, the control method including: managing, as a port assignment rule, port resources represented by assignable global addresses while the port resources are divided into port resources for sending from the private network and port resources for listening from the global network; managing a correspondence between information indicating an existing session and information indicating the port resource represented by the global address assigned to a session endpoint of the existing session on a side of the private network; translating, according to the correspondence between the existing session and the port resource, address information of a received packet, and assigning, when a packet for opening a new session for which the correspondence is not held is received, the port resource to the new session according to a port usage indicated by the port assignment rule; and changing, when an instruction to change a ratio between a number of assigned ports for sending and a number of assigned ports for listening is given, the port assignment rule while the correspondence between the existing session and the port resource is held.

A control program according to this invention is a control program for a device disposed on a boundary between a private network and a global network respectively having different address spaces, and mutually connecting the private network and the global network, the control program causing a computer for managing, as a port assignment rule, port resources represented by assignable global addresses while the port resources are divided into port resources for sending from the private network and port resources for listening from the global network, and managing a correspondence between information indicating an existing session and information indicating the port resource represented by the global address assigned to a session endpoint of the existing session on a side of the private network to execute processing of: translating, according to the correspondence between the existing session and the port resource, address information of a received packet, and assigning, when a packet for opening a new session for which the correspondence is not held is received, the port resource to the new session according to a port usage indicated by the port assignment rule; and changing, when an instruction to change a ratio between a number of assigned ports for sending and a number of assigned ports for listening is given, the port assignment rule while the correspondence between the existing session and the port resource is held.

Effect of the Invention

According to this invention, it is possible to more efficiently use the port resources which are the finite global address resources assigned to the address translation device.

BRIEF DESCRIPTION OF THE DRAWINGS

FIG. 6 is an explanatory diagram illustrating an example of an assignment distribution table.

BEST MODE FOR EMBODYING THE INVENTION

A description is now given of exemplary embodiments of this invention referring to drawings.

First Exemplary Embodiment

Figure 1:
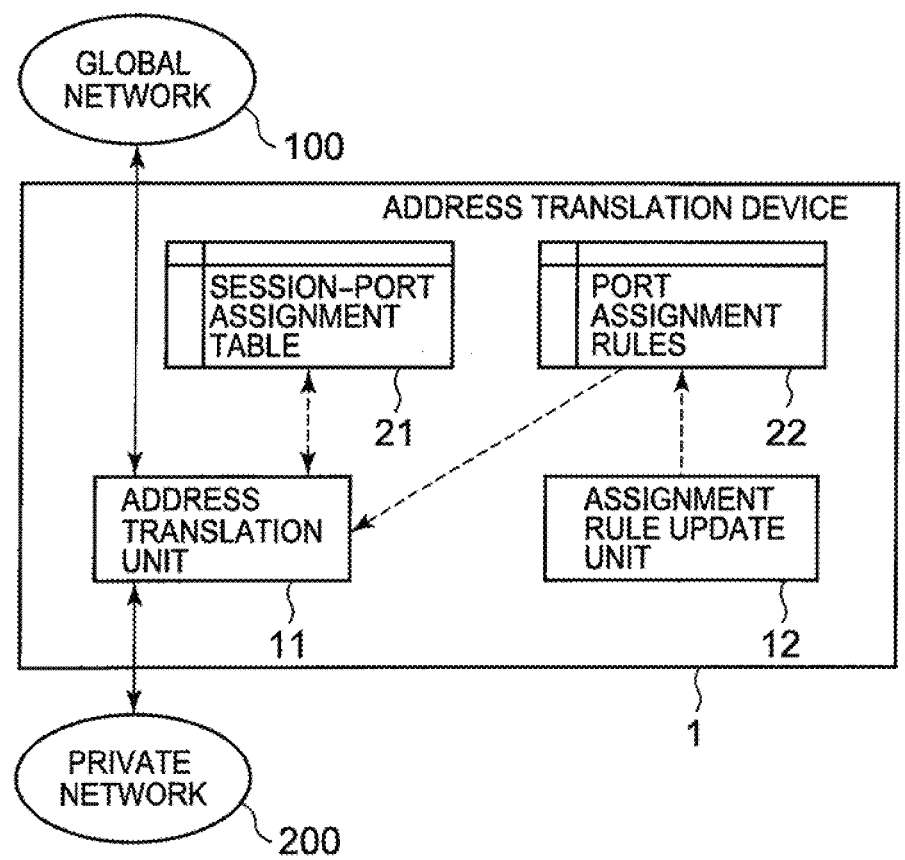
FIG. 1 is a block diagram illustrating a configuration example of an address translation device according to a first embodiment.

FIG. 1 is a block diagram illustrating a configuration example of an address translation device according to a first embodiment. As illustrated in FIG. 1, the address translation device 1 according to this embodiment is an address translation device offering an address translation function for an interconnection between a global network 100 and a private network 200, and includes an address translation unit 11, an assignment rule update unit 12, a session-port assignment table 21, and port assignment rules 22.

The session-port assignment table 21 contains information on correspondences between a session to which a port is presently assigned and a local endpoint in the address translation device 1 (an endpoint represented by a global address assigned by the address translation device 1 to a session endpoint in the private network side of this session, which is a port resource on this occasion). The port assignment rules 22 contain at least information on port usages (usages whether for listening or for sending) of ports which can be assigned by the address translation device 1.

The address translation unit 11 translates, according to a correspondence between an existing session and a port resource indicated by the session-port assignment table 21, address information of a received packet, and assigns a port to a packet for opening a new session according to a port usage indicated by the port assignment rules 22. The assignment rule update unit 12 changes, according to predetermined procedures, the ratio of the port usages.

It should be noted that the address translation unit 11 and the assignment rule update unit 12 are specifically realized by an information processing device operated by a program of a CPU or the like provided for the address translation device 1. The session-port assignment table 21 and the port assignment rules 22 are specifically realized by assigning predetermined areas to a storage device provided for the address translation device 1.

On this occasion, when the private network 200 is large in scale, as the traffic intensity in a telephone network, it is conceived that a quantity of sending per unit time can be estimated to some extent based on observed values depending on a time period and day of the week. The assignment rule update unit 12 carries out, without influencing the operation, the change of the assignment ratio of the port usages carried out based on the estimated value of the sending quantity per unit time such as the time period or day of the week. Specifically, while the correspondences between the existing session and the port resource in the session-port assignment table 21 are maintained, the assignment rule update unit 12 changes the ratio of the port usages in the port assignment rules 22. A description is now given of a specific realized example referring to drawings.

Figure 2:
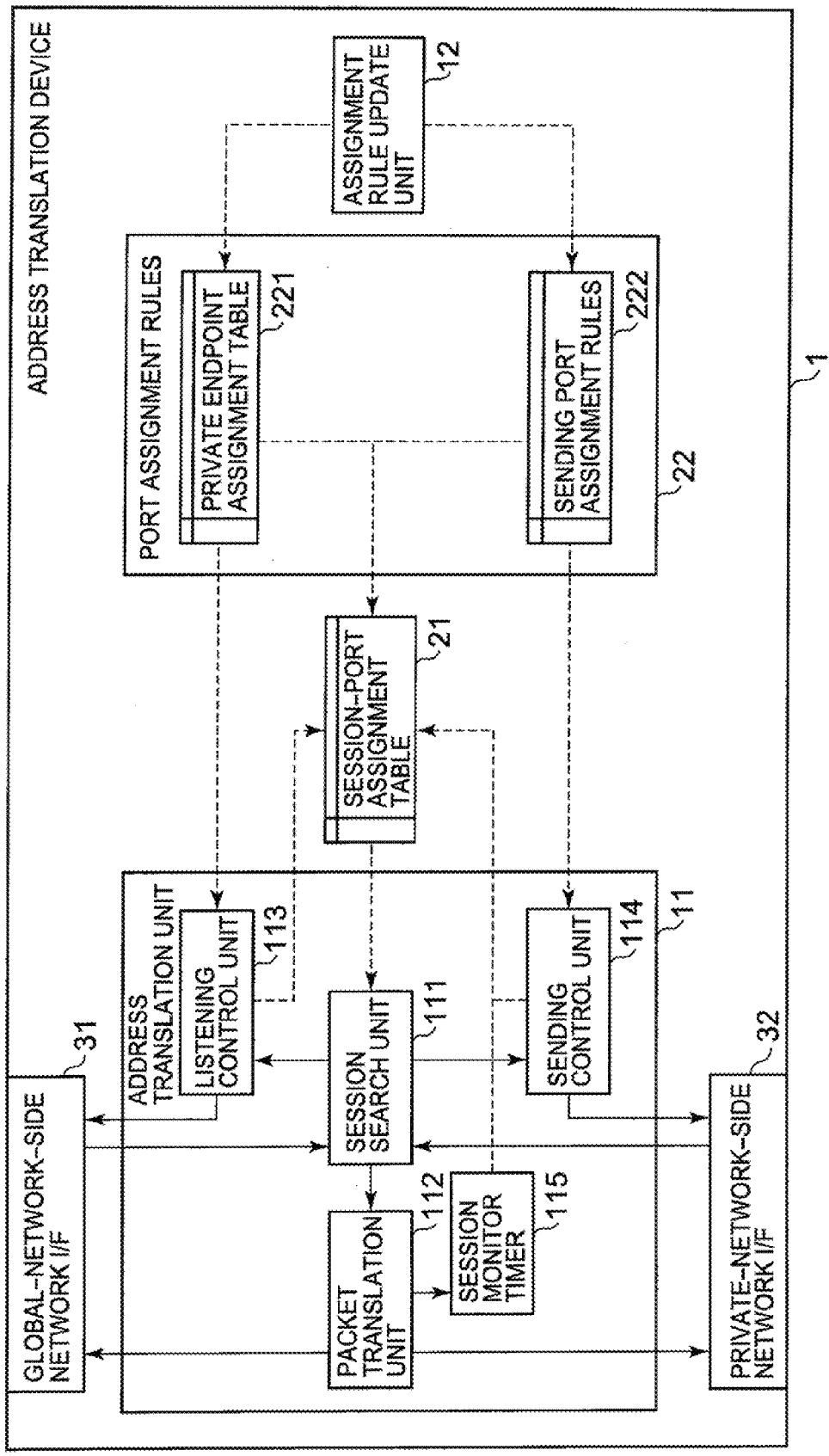
FIG. 2 is a block diagram illustrating a specific configuration example of the address translation device 1 according to the first embodiment.

FIG. 2 is a block diagram illustrating a specific configuration example of the address translation device 1 according to this embodiment. As illustrated in FIG. 2, the address translation device 1 includes a global-network-side network interface (referred to as global-network-side network I/F hereinafter) 31, a private-network-side network interface (referred to as private-network-side network I/F hereinafter) 32, the address translation unit 11, the assignment rule update unit 12, the session-port assignment table 21, and the port assignment rules 22. Moreover, the address translation unit 11 includes a session search unit 111, a packet translation unit 112, a listening control unit 113, a sending control unit 114, and a session monitor timer unit 115. Moreover, the port assignment rules 22 include a private endpoint assignment table 221 and sending port assignment rules 222.

FIG. 2 illustrates an example of a case in which the address translation unit 11 includes the session search unit 111, the packet translation unit 112, the listening control unit 113, the sending control unit 114, and the session monitor timer unit 115. Moreover, FIG. 2 illustrates an example of a case in which the port assignment rules 22 include the private endpoint assignment table 221 and the sending port assignment rules 222.

Through the global-network-side network I/F 31 and the private-network-side network I/F 32, the address translation device 1 connects respectively to the global network 100 and the private network 200 for transmitting/receiving packets. It should be noted that, though the single global-network-side network I/F 31 and the single private-network-side network. I/F 32 are illustrated, the address translation device 1 may be provided with a plurality of interfaces.

The session search unit 111 identifies, based on a packet that has arrived from a network interface, which is either the global network 100 or the private network 200, an entry registered for a session to which the packet belongs in the session-port assignment table 21.

The packet translation unit 112, based on information in the identified entry registered in the session-port assignment table 21, rewrites address information and the like of the packet, thereby translating the packet directed to the private network 200 into that directed to the global network 100, or vice versa.

The sending control unit 114, upon arrival of a packet for opening a new session directed from the private network 200 to the global network 100, creates an entry relating to the session in the session-port assignment table 21.

The listening control unit 113, upon arrival of a packet for opening a new session directed from the global network 100 to the private network 200, creates an entry relating to the session in the session-port assignment table 21.

The session-port assignment table 21 stores correspondences between a port resource of the address translation device 1 and a session whose communication is relayed by the address translation device 1 between the global network 100 and the private network 200. The session-port assignment table 21 may be a table containing sets of the following values as elements, for example.
21a: information on a session endpoint on the private network 200 side (private endpoint)
21b: information on a session endpoint on the global network 100 side (global endpoint)
21c: information on a local endpoint of the address translation device 1
21d: information on a network interface through which the session is routed Though the endpoint information is generally a set of an address and a port number on the transport layer, the endpoint information may contain additional information depending on necessity.

Moreover, the local endpoint information 21c of the address translation device 1 contains at least a set of an address assigned to the address translation device 1 in the global network and a port number assigned to a corresponding session. In addition, when an endpoint on the private network 200 side of the address translation device 1 is necessary for relaying a session according to the transport relay or the like, the local endpoint information 21c may contain information thereon.

Moreover, the session-port assignment table 21 is preferably configured so as to enable practically efficient search using the session endpoint information 21a on the private network 200 side and the session endpoint information 21b on the global network 100 side as keys. Specifically, the search can be realized by creating a hash table using values obtained by calculating from values of both the session endpoint information 21a and 21b, thereby providing reference from the hash table to the respective entries.

The sending port assignment rules 222 contain information for creating elements of an entry to be registered in the session-port assignment table 21 for a new session directed from the private network 200 side to the global network 100 side. The sending port assignment rules 222 contain at least information 222a on port numbers of local endpoints available for sending. Information 213a on the port numbers of the local endpoints available for sending may be in a range of port numbers assigned for the sending such as values 49152 (0xC000) to 65535 (0xFFFF).

The private endpoint assignment table 221 contains information for creating elements of an entry to be registered in the session-port assignment table 21 for a new session directed from the global network 100 side to the private network 200 side. The private endpoint assignment table 221 includes at least the following information.
221a: information on port numbers of local endpoints available for listening
221b: information on private endpoints of relay destinations for the above-mentioned respective port numbers available for listening The information 221a on the port numbers of the local endpoints available for the listening indicates values 1 (0x0001) to 49151 (0xBFFF) as a range of the port numbers assigned for the listening, for example, and the port number 80 out of them is information indicating a relay to the port number 80 at an address 10.0.0.50, for example.

The private endpoint assignment table 221 is preferably configured to enable efficient searches in terms of port numbers of the local endpoints.

Here, the assignment rule update unit 12 updates, according to predetermined procedures, the information 222a on the port numbers of the local endpoints available for sending contained in the sending port assignment rules 222, and the information 221a on the port numbers of the local endpoints available for listening contained in the private endpoint assignment table 221, which are described above. It should be noted that when the information 221a on the port numbers of the local endpoints available for the listening is updated, accordingly, the information 221b on the private endpoints of the relay destinations for the respective port numbers are updated.

The session monitor timer unit 115 has a time keeping function, monitors the respective entries in the session-port assignment table 21, and detects and deletes an entry presenting a timeout from entries for which the timer is set (started). It should be noted that the tinier is set in the session-port assignment table 21 when the packet translation unit 112, upon the identification of a session of a received packet, determines that the session possibly ends by the received packet. In other words, the session monitor timer unit 115, by measuring a no-communication period starting from transmission/reception of a packet, detects the end of the session, and, by deleting a corresponding entry, frees the assignment of the port.

Figure 3:
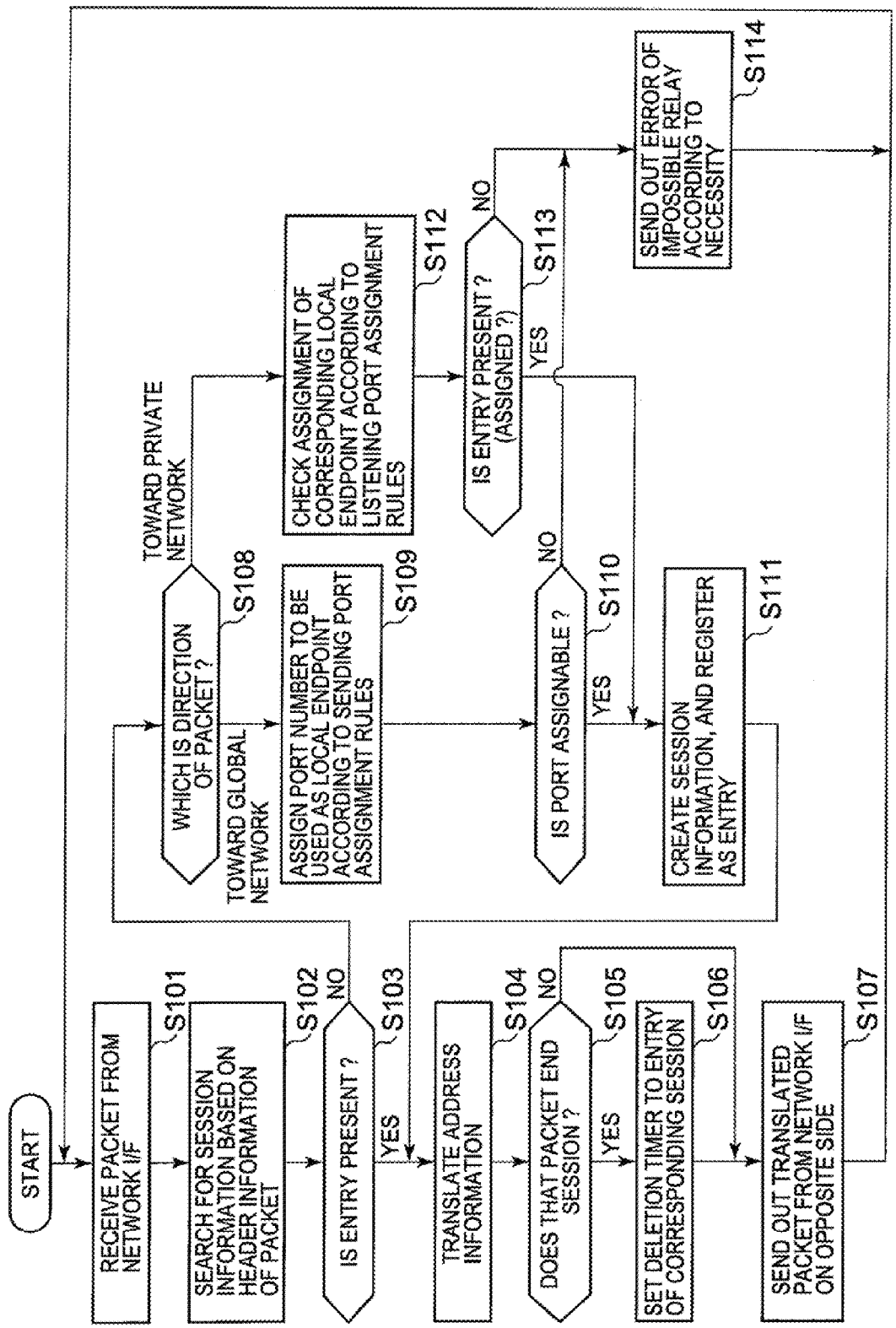
FIG. 3 is a flowchart illustrating an operation example of the address translation device 1 according to the first embodiment.

Next, referring to a flowchart in FIG. 3, a description is now given of an operation of this embodiment. FIG. 3 is a flowchart illustrating an operation relating to address translation processing in the address translation device 1 according to this embodiment.

As illustrated in FIG. 3, first, when a packet arrives at any one of the network interfaces (global-network-side network I/F 31 and private-network-side network I/F 32) (Step S101), the session search unit 111 of the address translation unit 11, based on a set of the IP address and the port number stored in the header of the received packet, searches for an entry of the session-port assignment table 21 in which information on a corresponding session is registered (Step S102).

On this occasion, when a corresponding entry is found, the packet translation unit 112, based on the endpoint information in the entry, rewrites the header (address information) of the packet ("Yes" in Steps S103, S104). Specifically, when the packet is directed to the private network 200, the packet translation unit 112 rewrites the destination address and the port number of the packet with those of the session endpoint (21*a*) on the private network 200 side indicated by the entry. On the other hand, when the packet is directed to the global network 100, the packet translation unit 112 rewrites the sending source address and the port number of the packet with those of the local endpoint (21*c*) indicated by the entry.

Moreover, when the address translation type requires rewriting of additional addresses, the packet translation unit 112 rewrites the additional addresses. For example, for the transport relay, destination address information of a packet directed from the private network 200 to the global network 100 represents an endpoint on the private network 200 side of the address translation device 1. In this case, the destination address and the port number are rewritten with the address and port number of a corresponding endpoint on the global network 100 side.

On this occasion, when the packet translation unit 112 determines that this packet possibly ends the session ("Yes" in Step S105), the packet translation unit 112, in order to prepare for the deletion of an entry of the session, sets a deletion timer for the entry (Step S106). The deletion timer may be set by setting a timer value corresponding to a period before the entry is to be deleted, thereby notifying the session monitor timer unit 115 of the timer being in operation, and causing the session monitor timer unit 115 to decrement the timer value, for example.

Moreover, packets which cause an end of a session include:
1. a TCP packet to which the FIN flag is set and which passes in the opposite direction on a TCP connection on which a TCP packet to which the FIN flag is set has passed, and 2. a passing UDP packet.

It should be noted that the determination as to whether a session possibly ends or not may be made by the session search unit 111 upon the identification of an entry.

Then, the packet after the address translation is sent out from an appropriate interface (network interface on the opposite side) (Step S107).

A description is now given of an operation of opening a session. In Step S103, when a corresponding entry is not present in the session-port assignment table 21, processing of opening a new session is carried out.

When a corresponding entry is not present in the session-port assignment table 21, the session search unit 111 determines the direction of the communication, and when the packet is directed to the global network 100, the sending control unit 114 is caused to carry out the session opening processing (Step S108). The sending control unit 114, according to the sending port assignment rules 222, assigns, from the range of the assignable port numbers, a port number (local port) to be used as a local endpoint (Step S109). For example, from the range of the assignable port numbers indicated by the sending port assignment rules 222, it is only necessary to determine one port number to be used as a local endpoint.

When a port number to be used as a local endpoint can be assigned ("Yes" in Step S110), the sending control unit 114 creates information on correspondence among information on the local endpoint, information on a session endpoint on the private network 200 side represented by sending source address information, and information on a session endpoint on the global network 100 side represented by destination address information, and registers, as an entry for the session, the created information in the session-port assignment table 21 (Step S111).

On this occasion, when the port number to be used as a local endpoint cannot be assigned ("No" in Step S110), for a reason that all the port numbers to be assigned for the sending are in use, or for other reasons (reason that a packet is not one for opening a session or the like), for example, predetermined processing such as sending an error of impossible relay to the source of sending (Step S114).

Moreover, as a result of the determination of the direction of the communication by the session search unit 111, when the packet is directed to the private network 200, the listening control unit 113 is caused to carry out the session open processing (Step S108). The listening control unit 113 refers to the private endpoint assignment table 221, thereby checking whether or not, to the local endpoint indicated by the destination address information of the packet, a port for listening is assigned (Step S112). In other words, the listening control unit 113 checks whether or not an entry indicating a session endpoint on the private network 200 side associated with the local endpoint indicated by the destination address information of the packet is present, and, when a corresponding entry is present ("Yes" in Step S113), creates information associating the information on the local endpoint, the information on the session endpoint on the global network 100 side indicated by the sending source address information, and the information on the session endpoint on the private network 200 side indicated by the destination address information with each other, and registers the created information, as an entry for the session, in the session-port assignment table 21 (Step S111).

On this occasion, for a reason that the listening processing is not carried out for the specified local endpoint, or other reasons (reason that a packet is not one for opening a session or the like), when a corresponding session endpoint on the private network 200 side cannot be identified ("No" in Step S113), as in the sending processing, predetermined processing such as sending an error of impossible relay to the source of sending is carried out (Step S114).

It should be noted that, after the new entry is created in the session-port assignment table 21, similarly to the existing session, it is considered that an entry containing corresponding session information has been found ("Yes" in Step S103), the address translation processing by the packet translation unit 112 and the like are carried out, the deletion timer is set according to necessity, and the packet having the translated address is sent out from an appropriate interface (network interface on the opposite side) (Steps S104 to S107).

A description is now given of processing relating to detection of an end of a session (session entry deletion processing). Though it is only necessary to delete an entry registered in the session-port assignment table 21 when a session ends, the determination of the end of the session varies depending on the protocol and address translation method. For example, according to a connectionless protocol such as the UDP, information indicating an end of a session is not present in a packet, and hence it is not possible to delete an entry in the session-port assignment table 21 upon a passage of a packet. According to this embodiment, in order to detect an end of a session even in this case, the deletion timer is set (started) each time when a packet passes, and, when the deletion timer expires and hence an elapse of a predetermined no-communication period is detected, an entry is deleted.

Figure 4:
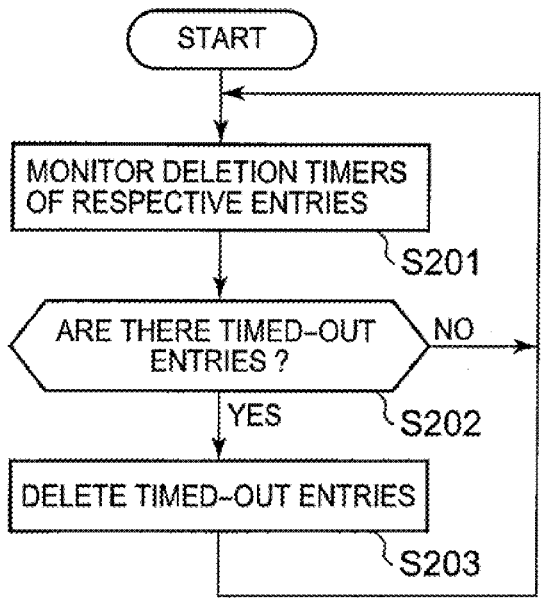
FIG. 4 is a flowchart illustrating an operation example of session entry deletion processing in the address translation device 1 according to the first embodiment.

FIG. 4 is a flowchart illustrating an operation example of the session entry deletion processing in the address translation device 1 according to this embodiment. As illustrated in FIG. 4, the session monitor timer unit 115 periodically monitors whether or not the deletion timer has been set to the respective entries in the session-port assignment table 21 (Step S201). When there are entries to which the deletion timer is set, the session monitor timer unit 15 carries out time keeping processing corresponding to the tinier value (such as decrement of the timer value), thereby detecting a timeout. As the result of the time keeping processing, when there are timed-out entries, the session monitor timer unit 15 deletes the entry from the session-port assignment table 21 (Step S203).

It should be noted that the deletion timer set for an entry in the session-port assignment table 21 resets the timer value when a packet passes in the session indicated by the entry. In this way, while packets are passing in an interval shorter than the timer value of the deletion timer, the session information is maintained.

Figure 5:
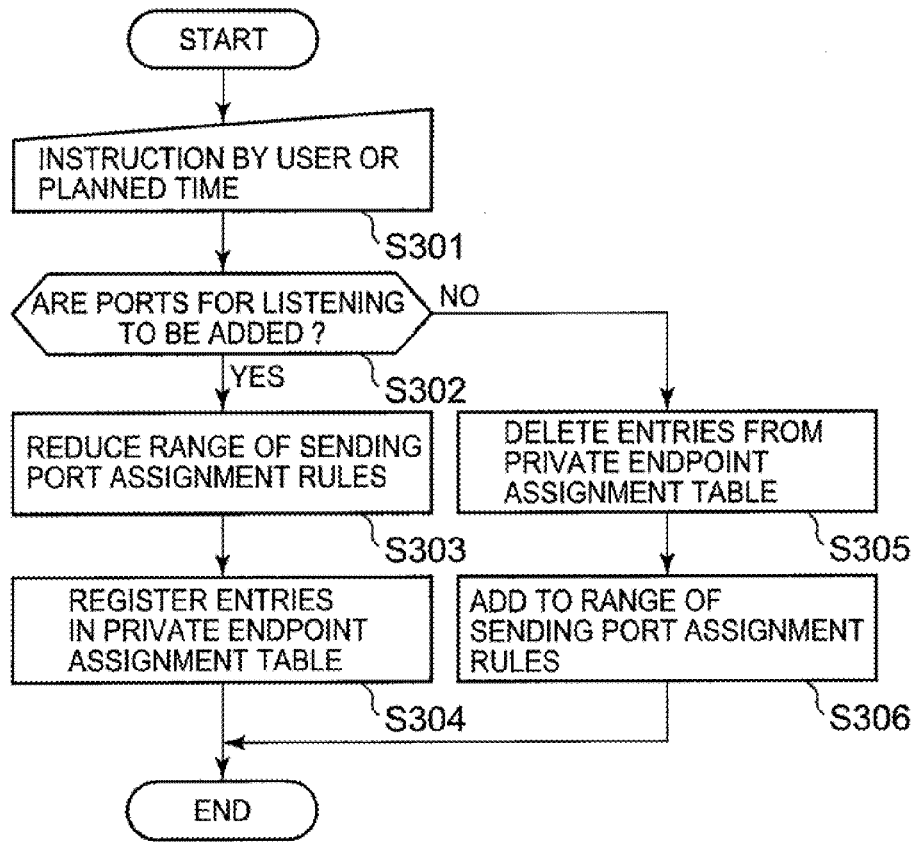
FIG. 5 is a flowchart illustrating an operation example of assignment change processing for ports for sending/listening carried out by an assignment rule update unit 12.

A description is now given of an operation performed when assignments of ports for sending/listening are changed. FIG. 5 is a flowchart illustrating an operation example of assignment change processing for ports for sending/listening carried out by the assignment rule update unit 12.

As illustrated in FIG. 5, the assignment rule update unit 12, based on an instruction by a user or a predetermined distribution plan, carries out the assignment change processing of the ports for sending/listening (Step S301).

On this occasion, this distribution plan may assign a large number of port resources for sending in a period from day to evening when the sending from the private network 200 is frequently carried out, and may increase the assignments of the ports for listening in the early morning when the sending decreases, for example.

At what ratio the distribution should actually be carried out may be determined by statistically calculating demands from used amounts of the both ports for listening and sending in the past. It should be noted that it is conceived that the calculation of the ratio according to the time period may be automatically carried out by the assignment rule update unit 12 using past data.

An assignment change instruction or a distribution plan, as information used for an entry in the private endpoint assignment table 221, for example, may provide information indicating a set of port numbers to be used for the listening and private network endpoints (session endpoints on the private network 200 side) of respective elements of the set (respective port numbers used for listening). Specifically, it is conceived that an assignment distribution table as illustrated in FIG. 6 is provided, and the assignment rule update unit 12, according to the table illustrated in FIG. 6, changes the assignments for respective specified times.

For example, FIG. 6 illustrates that, in a time period from 0:00 to 1:00, a port number 1 of a local endpoint is to be assigned to a private endpoint 10.1.0.1:80 for listening. In addition, in each time period, with the respective port numbers of local endpoints used as ports for listening, private endpoint information is associated.

The assignment rule update unit 12, according to an assignment change instruction or a distribution plan as mentioned above, updates the entries in the private endpoint assignment table 221. For example, the assignment rule update unit 12 detects a change between the present assignment status of the ports for listening indicated by the private endpoint assignment table 221 and a new listening port assignment instruction. Then, when the change is an addition of ports for listening (namely, a change from ports for sending to the ports for listening) ("Yes" in Step S302), the assignment rule update unit 12 deletes information indicating that the ports to be changed into those for listening are assignable from the sending port assignment rules 222, and adds entries of the ports associated with private endpoints which are destinations of assignment to the private endpoint assignment table 221 (Steps S303 and 304). On the other hand, when the change is an addition of ports for sending (namely, a change from ports for listening to the ports for sending) ("No" in Step S302), the assignment rule update unit 12 deletes entries of the ports to be changed for the sending from the private endpoint assignment table 221, and adds information indicating that the ports are assignable to the sending port assignment rules 222 (Steps S305 and 306).

In any case, the entries in the session-port assignment table 21 are not changed. In this way, without influencing existing sessions, the port usages can be changed.

Moreover, the existing sessions do not influence the change of the port usages. This is because sets of endpoints used by the existing sessions are not used for new sessions, and, as a result of the switching of the port usages, entries overlapping the entries for the existing sessions in the session-port assignment table 21 will not be created.

As a result, the port usages can be switched without causing a trouble in the operation. Thus, the port usages can be frequently switched, and even for connection to a large-scale private network, the port resources assigned to the address translation device, which are limited global address resources, can be more efficiently utilized.

Second Exemplary Embodiment

A description is now given of a second embodiment of the address translation device according to this invention. This embodiment is an example of an address translation device 1 having a charging function. For a case in which port numbers are exhausted, in order to realize fair distribution of the port resources, charging users may be desirable. When the use of the port resources provided for the address translation device 1 is charged, it is desirable to consider the difference in port usages (whether ports are used for sending or for listening) as mentioned before.

For listening, it is necessary, in advance, to reserve a port number for relaying all sessions to a specific host node on the private network. Thus, one host node on the private network exclusively occupies the port resources. Though, for sending, upon establishment of a session, to a specific endpoint on the global network, a port number is assigned, the same port number may be assigned to other endpoints on the global network side. Thus, one host node on the private network does not exclusively occupy the port resources. In this way, according to the usages, the time and the quantity of the assignment vary, and hence it is preferable to apply different charging mechanisms to the different usages.

For the listening usage, regardless of presence/absence of session, a port number is assigned so as to be reserved in a fixed manner, and hence it is only necessary to charge a user of the port from the start to the end of listening.

The setting for listening is usually carried out by predetermined reservation means (such as a port reservation system). Thus, for the charge on use of a port for listening, it is only necessary to integrate charging processing to reservation processing of the system, and no special mechanism therefor is necessary.

On the other hand, for the sending usage, a port for sending is assigned as a use for a specific endpoint on the global network side which will be a destination when a session is opened. Moreover, an endpoint on the private network side of a sending source is uniquely determined. Therefore, for a charge regarding a port for sending, it is appropriate, for each session, to charge a user who can be identified according to a sending source or a destination endpoint.

In order to charge in this way, it is necessary to identify a user to be charged according to an endpoint. In general, a packet does not contain information for directly identifying a user, and hence, a method of charging by associating a sending source, a destination address, or the like of a packet and a user with each other is conceived.

Figure 7:
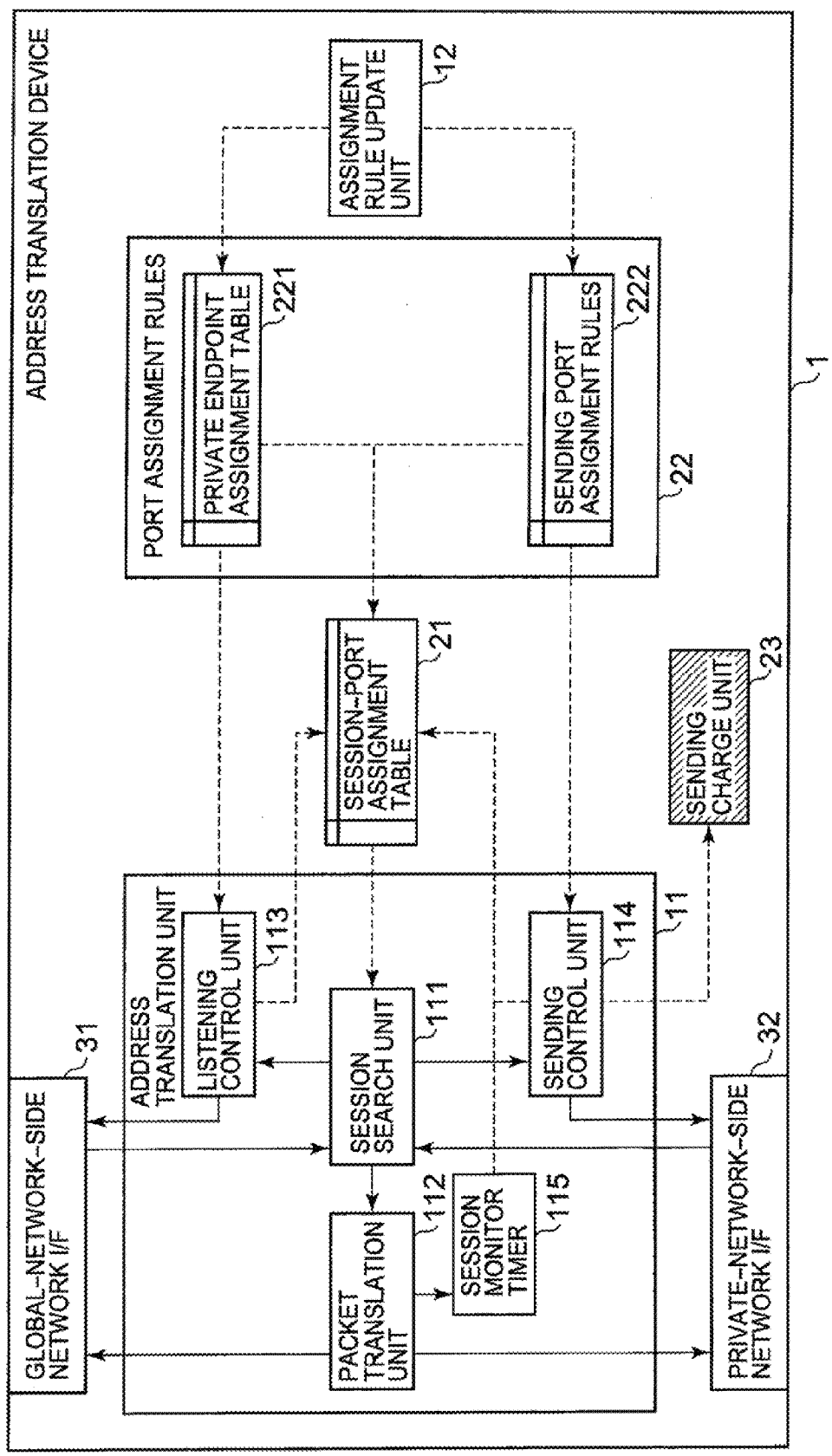
FIG. 7 is a block diagram illustrating a configuration example of an address translation device 1 according to a second embodiment.

FIG. 7 is a block diagram illustrating a configuration example of the address translation device 1 according to this embodiment. As illustrated in FIG. 7, the address translation device 1 according to this embodiment is provided with, in addition to the address translation device 1 according to the first embodiment illustrated in FIG. 2, a sending charge unit 23.

The sending charge unit 23 stores charge information for the communication directed to the global network 100 side. The sending charge unit 23 is specifically realized by a storage device provided for the address translation device 1.

Moreover, according to this embodiment, the sending port assignment rules 222 contain user identification information for identifying a user for each endpoint on the private network 200 side.

Moreover, the sending control unit 114, upon opening of a session directed to the global network 100 side, based on information on an endpoint on the private network side obtained from header information of a packet which has caused the opening of the session and the user identification information contained in the sending port assignment rules, identifies a user to be charged, creates charge information, and causes the sending charge unit 23 to store the charge information.

Figure 8:
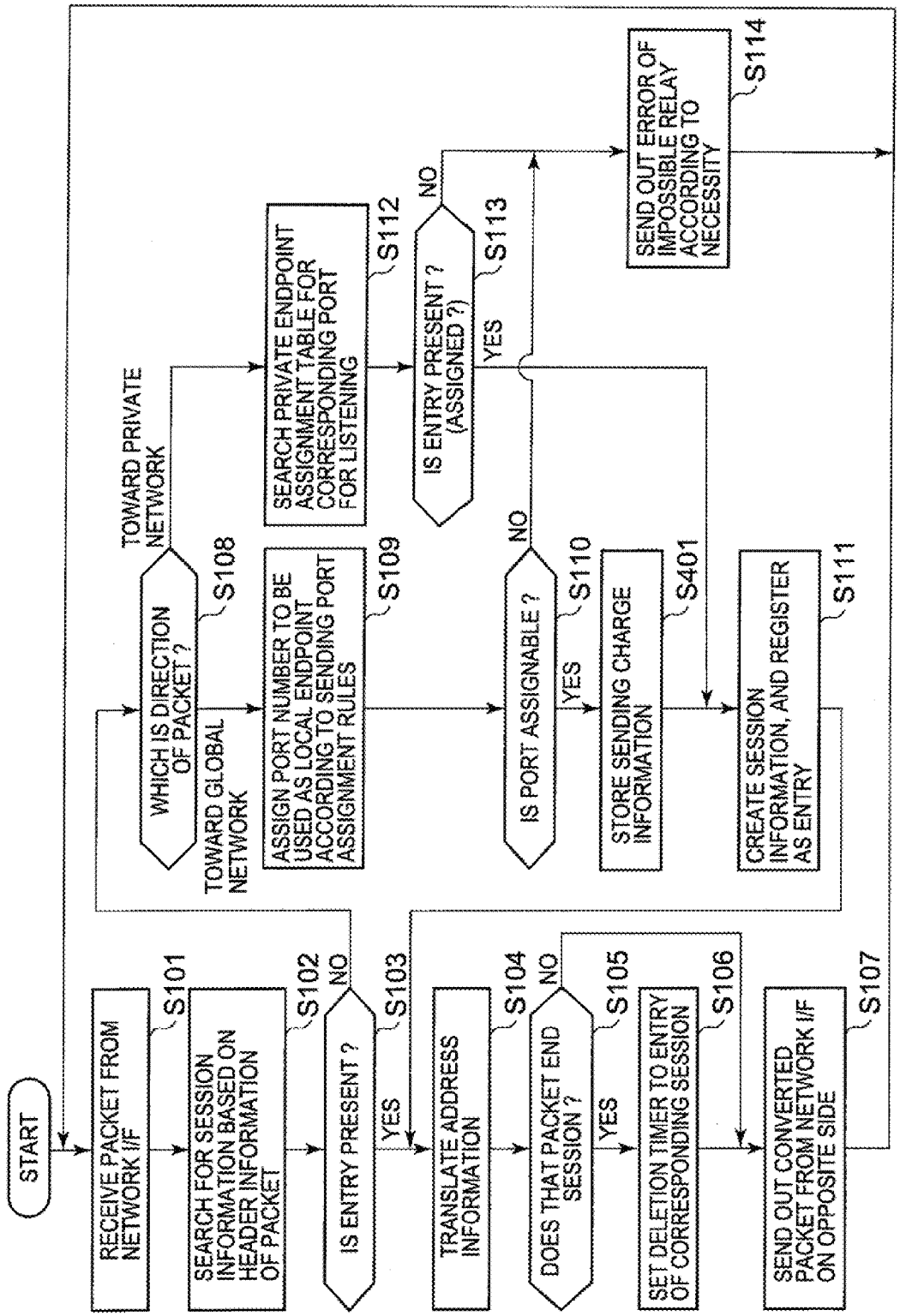
FIG. 8 is a flowchart illustrating an operation example of address translation processing in the address translation device 1 according to the second embodiment.

A description is now given of an operation of this embodiment. FIG. 8 is a flowchart illustrating an operation example of the address translation processing in the address translation device 1 according to this embodiment. It should be noted that Steps S101 to S110 and Steps S111 to S114 in FIG. 8 are the same as those of the first embodiment illustrated in FIG. 3, and hence description thereof is omitted.

As illustrated in FIG. 8, upon reception of a packet relating to opening a session in the direction toward the global network 100, the sending control unit 114, when the entry for the session to which the port number to be used as the local endpoint has been assigned is created, stores charge information on sending in the sending charge unit 23 (Step S401). It is only necessary for the sending control unit 114 to obtain, from the header of the received packet, information on the endpoint on the private network 200 side, and, by, based on the information, searching the sending port assignment rules for corresponding user identification information, to identify a user to be charged. It should be noted that the charge information to be stored in the sending charge unit 23 may be information on correspondence between a user identifier and the number of times of sending, for example. Moreover, for each sending, information such as time of sending and information on destination may be maintained.

As a result, on the use of port in the address translation device 1, the charge more precisely reflecting real usage is realized.

It should be noted that though this embodiment describes the example in which the charge is carried out upon opening of a session, charge may also be carried out according to a period of connection. For example, the sending control unit 114, upon opening of a session, may cause the sending charge unit 23 to store the charge information containing the session information (at least a set of session endpoints) and a start time, and, when a session monitor timer unit 115 detects an end of the session due to the expiration of the deletion timer and the session uses a port for sending, may register the end time in the charge information including the matching session information indicated by the entry that is subject to deletion.

Third Exemplary Embodiment

A description is now given of a third embodiment of the address translation device according to this invention. This embodiment is an example of an address translation device 1 having a sending wait queue. In the address translation device 1, to a port for sending, the same number may be assigned when corresponding endpoints are different, and hence, due to the statistical multiplexing effect, compared with the listening, port resources can be more efficiently assigned. It should be noted that there are many sessions which are short in session duration relating to sending carried out once such as sending for opening a connection, and the amount of sending fluctuates significantly in a short period. Therefore, even if an average demand is estimated and port resources are reserved for sending, an amount of sending exceeding the estimated average demand may occur.

Moreover, for example, when a service on a specific site is broadcast on TV or the like, a situation in which, on a single corresponding endpoint, sending is concentrated may arise. When a plurality of connections are made to a single corresponding endpoint, on the local endpoint side, it is necessary to assign different port numbers (as port resources in the address translation device 1) to the respective connections, and hence the port resources may not be efficiently assigned.

When the sending is congested in this way, and packets for opening a connection are simply discarded, for example, resending of packet frequently occurs, resulting in a possible waste of network bandwidth, and, due to the resending frequency, the port assignment may not be fair.

In order to alleviate the disorder at the time of the congestion, it is only necessary, in the address translation device 1, to provide a queue for waiting for sending, and to carry out sequence control for fair port assignment for sending.

Figure 9:
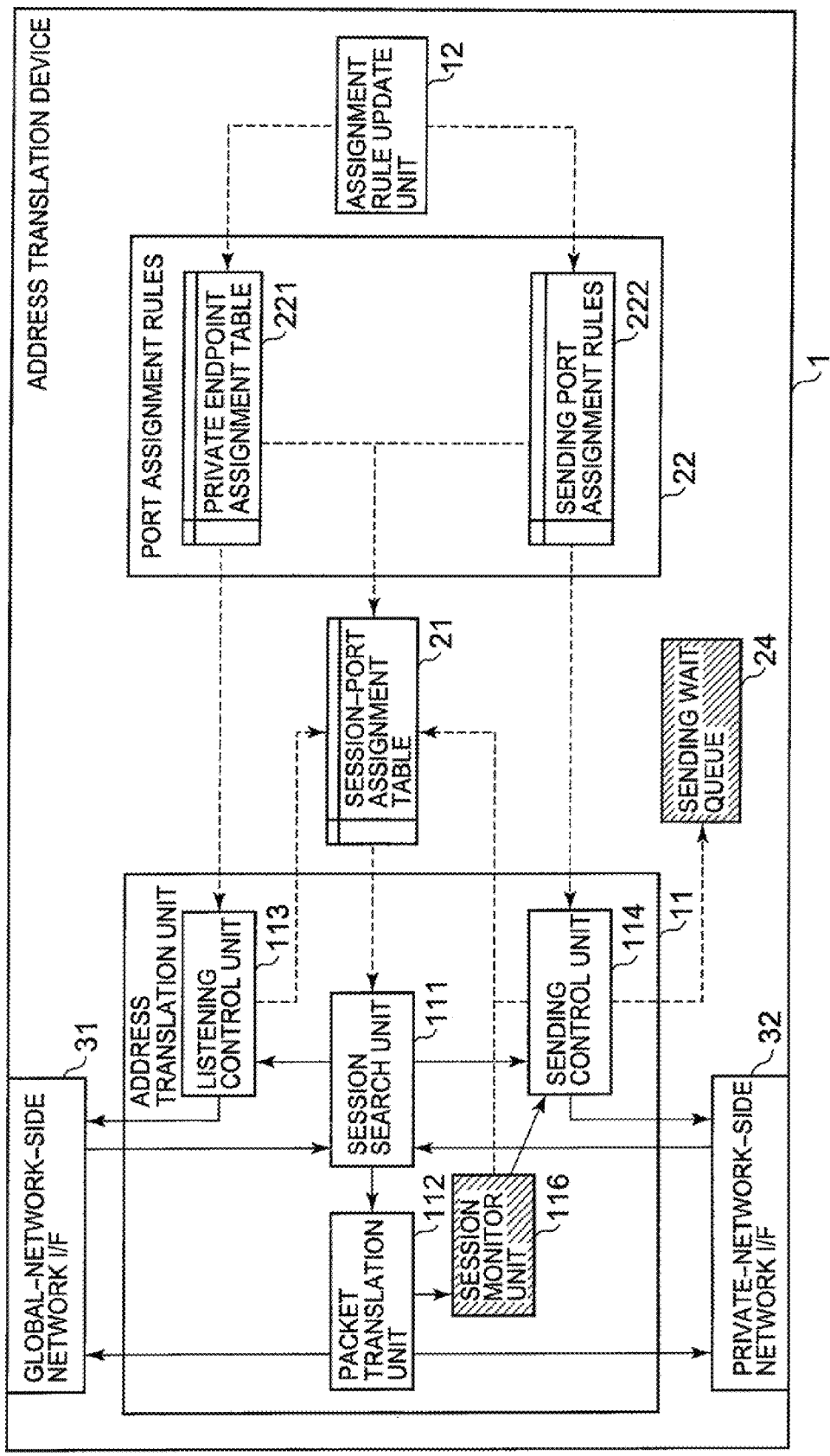
FIG. 9 is a block diagram illustrating a configuration example of an address translation device 1 according to a third embodiment.

FIG. 9 is a block diagram illustrating a configuration example of the address translation device 1 according to this embodiment. As illustrated in FIG. 9, the address translation device 1 according to this embodiment has a configuration in which, to the configuration of the address translation device 1 according to the first embodiment illustrated in FIG. 2, a sending wait queue 24 is added, and the session monitor timer unit 115 is changed to a session monitor unit 116.

The sending wait queue 24 temporarily stores a packet (session open packet) which is a packet for opening a session directed to the global network 100 side, and to which a port number to be used as a local endpoint (namely, a port resource for sending) is not assigned. It should be noted that the sending wait queue 24 has a control unit (not shown) having a function of inspecting, while the sequence of holding packets is maintained, header information of the held packets, and a function of extracting a specific packet.

The session monitor unit 116, similarly to the session monitor timer unit 115, has a time keeping function, a function of monitoring the deletion timer for respective entries in the session-port assignment table 21, and deleting timed-out entries, and further a function of notifying, of information of the deleted entries, the sending control unit 114.

Moreover, according to this embodiment, the sending control unit 114, for a session open packet directed to the global network 100 side, when a port number to be used as a local endpoint cannot be assigned due to no free port for sending, causes the sending wait queue 24 to hold the packet (session open packet). Moreover, when the session monitor unit 116 notifies the sending control unit 114 of deletion of an entry relating to the end of a session, the sending control unit 114 tries to assign, to the packets held in the sending wait queue 24, a port for sending freed as a result of the deletion of the entry.

It should be noted that the sending wait queue 24 is specifically realized by the storage device and an information processing device operating according to a program of the CPU or the like provided for the address translation device 1. Moreover, the session monitor unit 116 is specifically realized by an information processing device operating according to a program of the CPU or the like provided for the address translation device 1.

Figure 10:
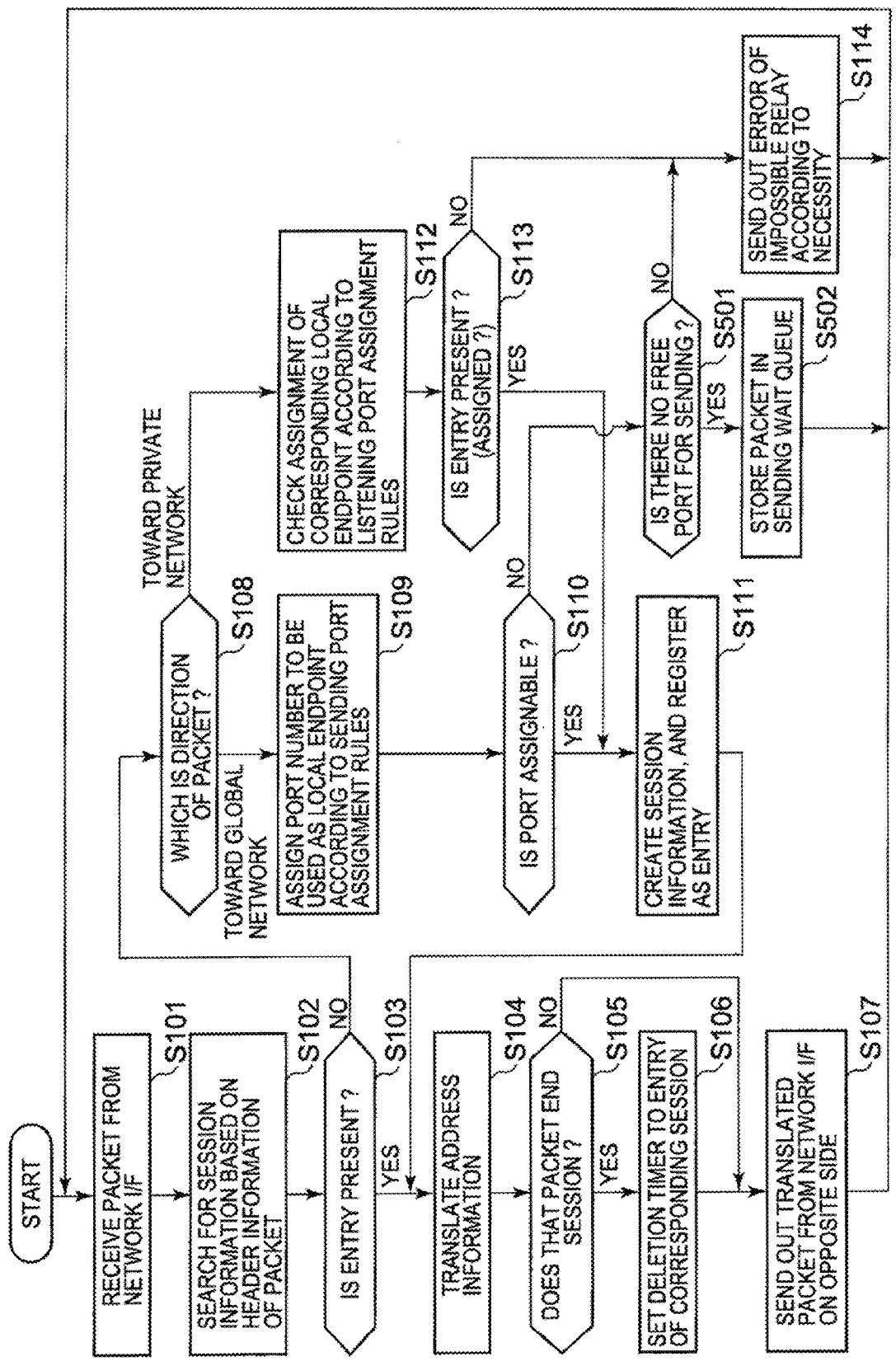
FIG. 10 is a flowchart illustrating an operation example of the address translation processing in the address translation device 1 according to the third embodiment.

A description is now given of an operation of this embodiment. The operation relating to this embodiment includes processing caused by reception of a packet and processing caused by deletion of an entry. First, a description is given of the processing caused by the reception of a packet. FIG. 10 is a flowchart illustrating an operation example of the address translation processing in the address translation device 1 according to this embodiment. It should be noted that Steps S101 to S110 and Steps S111 to S114 in FIG. 10 are the same as those of the first embodiment illustrated in FIG. 3, and hence description thereof is omitted.

As illustrated in FIG. 10, when a packet relating to opening of a session directed to the global network 100 is received, and a port number to be used as a local endpoint cannot be assigned ("No" in Step S1110), the sending control unit 114 determines whether or not the failed assignment is caused by no free port for sending (Step S501). When the failure is caused by a reason other than no free port, the same processing as the processing performed upon a failure in the port assignment according to the first embodiment is carried out (Step S114).

When a port number to be used as a local endpoint cannot be assigned due to no free port, the received packet is not discarded, and is stored in the sending wait queue 24 (Step S502). When the packet for opening a session, to which a port is not assigned, is stored in the sending wait queue 24, the processing caused by reception of a packet according to this embodiment ends.

Figure 11:
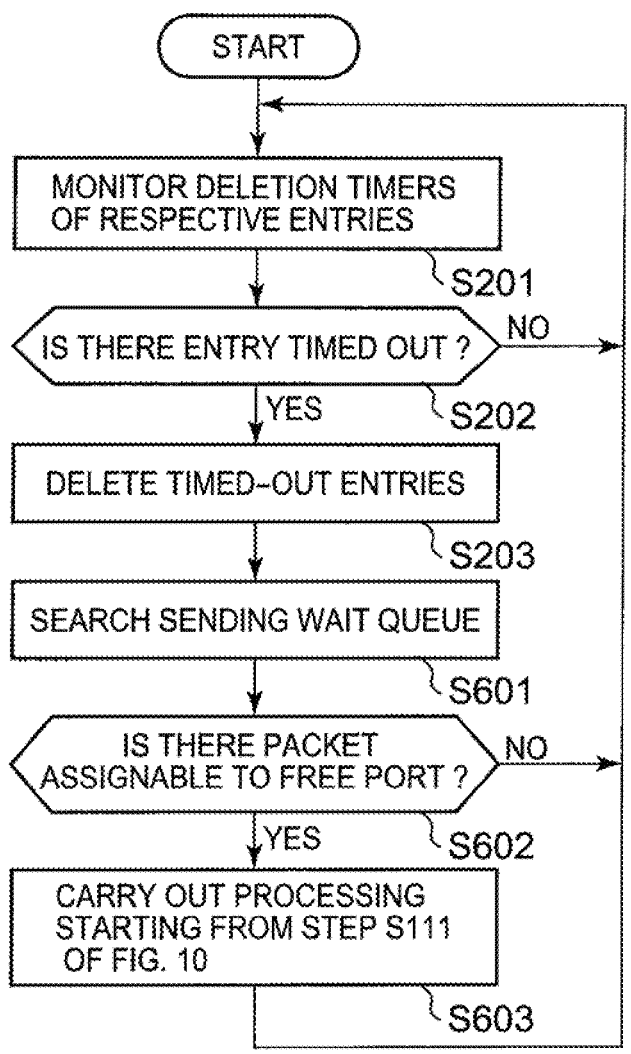
FIG. 11 is a flowchart illustrating an operation example of the session entry deletion processing in the address translation device 1 according to the third embodiment.

A description is now given of the processing caused by deletion of an entry. FIG. 11 is a flowchart illustrating an operation example of the session entry deletion processing in the address translation device 1 according to this embodiment. It should be noted that Steps S201 to S203 in FIG. 11 are the same as those of the first embodiment illustrated in FIG. 4, and hence description thereof is omitted. It should be noted that the operation corresponding to Steps S201 to S203 is carried out by the session monitor unit 116.

As illustrated in FIG. 11, the session monitor unit 116, similarly to the session monitor timer unit 115 according to the first embodiment, monitors the setting statuses of the deletion timer of the respective entries registered in the session-port assignment table 21, carries out the time keeping operation according to necessity, and deletes timed-out entries (Steps S201 to S203).

On this occasion, information on a local endpoint and a global endpoint that have been used by the deleted entry is stored.

The session monitor unit 116 inspects packets held in the sending wait queue 24 starting from the oldest one (in an order of registration) (Step S601), and checks, based on the endpoint information specified by the deleted entry, whether or not a packet can be sent (Step S602). Specifically, when the global endpoints indicated by the destination address information match, the session monitor unit 116 determines that the local port is assignable. In this case ("Yes" in Step S602), the processing starting from Step S111 in FIG. 10 is carried out.

In other words, to a packet which is selected from the packets held in the sending wait queue 24 and can be sent, a local endpoint used by the deleted entry is assigned, an entry for a session to be opened by the packet is created, and the created entry is registered in the session-port assignment table 21 (Step S111). Then, after the new entry is created in the session-port assignment table 21, as in the case for an existing session, the address translation processing by the packet translation unit 112 and the like are applied, and, from an appropriate interface (network interface on the opposite side), the packet having the translated address is sent out (Steps S104 to S107).

On the other hand, when there is no packet having a matching global endpoint ("No" in Step S602), all local ports whose corresponding endpoints are global endpoints serving as destinations of all the packets held in the sending wait queue 24 are in use, and hence the port assignment to the packets held in the sending wait queue 24 is not carried out, and the processing directly ends.

As a result, when all the ports for sending are in use, and the sending from the private network 200 cannot be carried out, by sequentially holding the packets causing opening of a session as a result of sending, free ports can be sequentially assigned. Thus, compared with the case without the sequential control, more fair port assignment can be carried out.

Fourth Exemplary Embodiment

A description is now given of a fourth embodiment of the address translation device according to this invention. This embodiment is an example of an address translation device 1 for controlling a sending wait queue in consideration of priority. The address translation device 1 according to this embodiment is provided with a plurality of sending wait queues 24 corresponding to respective priorities. Moreover, for correspondence between a session and a priority, the sending port assignment rules include information on correspondence between a private endpoint and priority information.

Moreover, according to this embodiment, when a local port cannot be assigned due to no free port for sending, the sending control unit 114 identifies a priority based on header information of the packet, and causes the sending wait queue 24 corresponding to the identified priority to hold the packet. Specifically, according to information on a private endpoint of a sending source obtained from the header of the packet, by searching for the priority information of the sending port assignment rules, the priority of the packet for sending is identified.

Moreover, the session monitor unit 116, when a vacancy occurs in the entries in the session-port assignment table 21, checks assignable packets in an order from the sending wait queue 24 having a higher priority.

In this way, to a sending from a specific user, a port for sending can be assigned by priority. For example, in combination with the second embodiment, assignment of a port for sending to traffic of a user paying a high charge by priority is enabled.

Fifth Exemplary Embodiment

A description is now given of a fifth embodiment of the address translation device according to this invention. This embodiment is an example of an address translation device 1 for automatically adjusting an assignment ratio of the port usages. In this embodiment, the assignment rule update unit 12 has a function of adjusting, by rewriting the port assignment rules 22, the distribution of the port resources between those for sending and those for listening. On this occasion, while the determination of the ratio between the usages is based on predetermined procedures (specifically, an instruction given by a user or a distribution plan), according to this embodiment, an example of automatic determination is described. In other words, an example of a configuration and a method in which the update procedures for the port assignment rules 22 do not include a user operation is described.

Strategies of this embodiment are as follows.

A mechanism for observing communication quantity for sending and listening, and calculating statistics for respective time periods is provided.

Different charges can be set respectively to the sending and listening.

Initial values are set to the prices and the distribution ratio of the port resources, and, by observing the reserved quantity of ports for listening and the quantity of the sending processing, whether or not the prices and the distribution ratio are appropriate is determined.

When the prices and the distribution ratio are not appropriate, the distribution ratio and the port usage charges are adjusted so that both the sending and listening are not congested.

According to these strategies, by repeating the above-mentioned determination, without manual means, the distribution ratio and the usage charge of the port resources can progressively approach optimal values.

Figure 12:
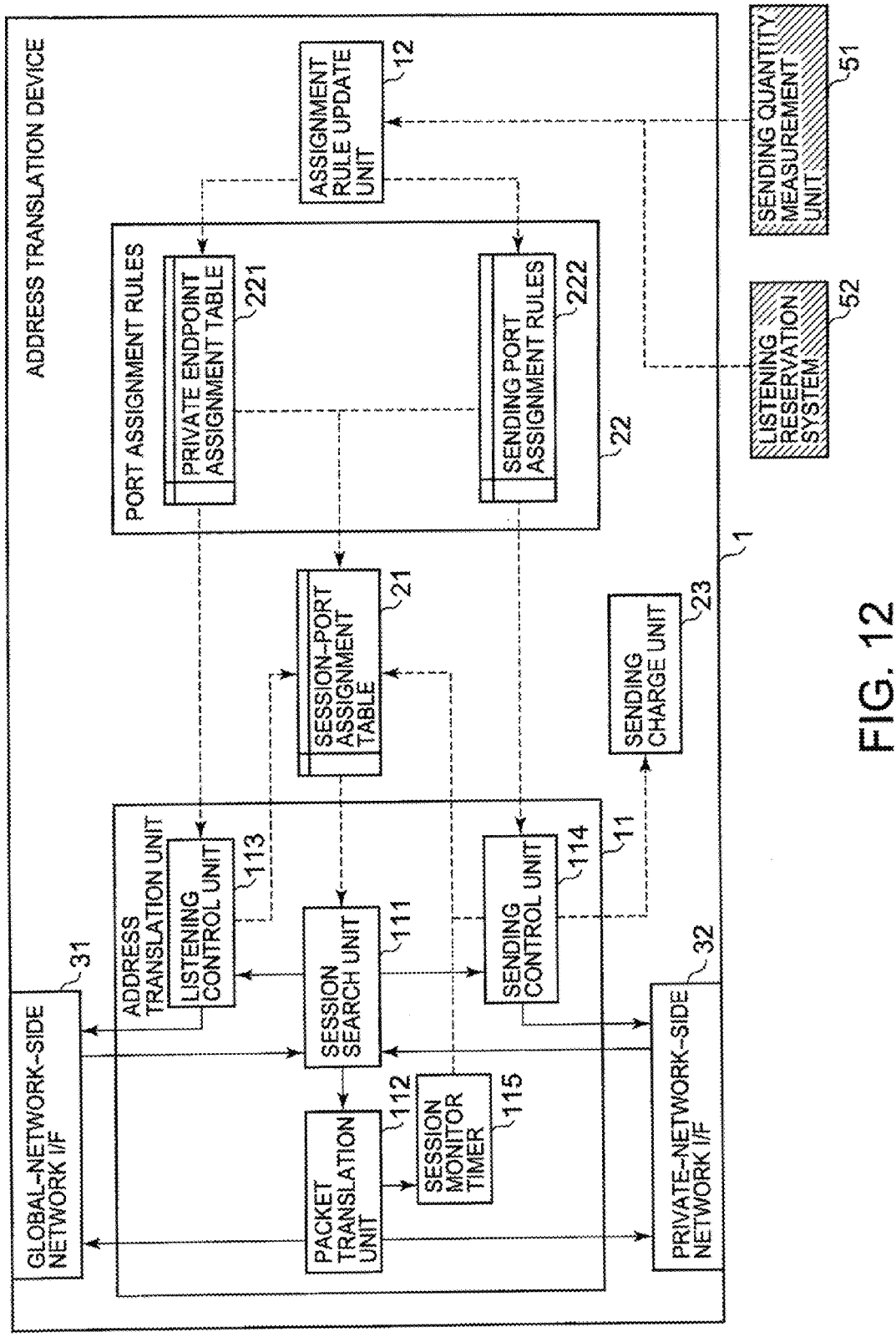
FIG. 12 is an explanatory diagram illustrating a configuration example of an address translation system for automatically adjusting an assignment ratio of port usages.

FIG. 12 is a block diagram illustrating a configuration example of the address translation system according to this embodiment. As illustrated in FIG. 12, according to this embodiment, a sending quantity measurement unit 51 and a listening reservation system 52 are further provided. In FIG. 12, the sending quantity measurement unit 51 and the listening reservation system 52 are independent devices, but may be integrated into the address translation device 1.

The sending quantity measurement unit 51 stores, out of the traffic passing through the address translation device 1, a quantity of sessions in the sending direction to the global network 100 side (quantity of sessions which have carried out sending processing) for respective time periods. The sending quantity measurement unit 51, for example, is realized by a device for observing the traffic passing through the address translation device 1. When the sending quantity measurement unit 51 is integrated into the address translation device 1, the sending quantity measurement unit 51 may observe the quantity of sessions in the sending direction to the global network 100 side according to notifications from the packet translation unit 112 or the sending control unit 114.

The listening reservation system 52 is means for reserving the ports for listening of the address translation device 1, and, by receiving, via networks or the like from external systems and users, the following information, reserves the ports for listening of the address translation device 1.

52*a*: a set of a port number of a local endpoint used for listening and a private endpoint of a relay destination

52*b*: reserved time period

Moreover, the listening reservation system 52, in addition to the reservation, transmits information on the reserved ports (including number of reserved ports) to the address translation device 1 (specifically, the assignment rule update unit 12), sets an upper limit to reservation assignment quantity, obtains a value of the upper limit from the address translation device 1, charges on respective ports upon the reservation, and sets the port usage charges for the respective time periods.

According to this embodiment, as in the second embodiment, the mechanism for charging upon sending (sending charge unit 13) is provided. On this occasion, for the charge in the sending direction, it is difficult for a user to confirm the charge upon use, and hence, the charge is preferably constant regardless of the time period.

A description is now given of an operation of this embodiment. The assignment rule update unit 12 automatically carries out the assignment of the port resources (including determination of the assignment ratio) in the following way. The assignment rule update unit 12 periodically obtains the quantity of the sending processing from the sending quantity measurement unit 51, and the reserved quantity of the ports for listening from the listening reservation system 52. Then, the assignment rule update unit 12, using those quantities, calculates the statistics in a predetermined unit such as the time period and day of the week according to which communication quantity varies.

For example, the assignment rule update unit 12, using the observed values (quantity of the sending processing and reserved quantity of the ports for listening) obtained as a result of operation for a certain period, obtains, in a certain time period on a certain day of the week (denoted by t), an expected value of the quantity of the listening port reservation pr_t and an expected value of the quantity of the sending processing ps_t.

Then, the assignment rule update unit 12, from the expected values, determines an upper limit p_t of the number of the assigned ports for listening and a unit price vr_t of a port for listening in a future time period t, for the following respective cases. On this occasion, the upper limit of the number of ports for listening of the reservation assignment is denoted by p_0; a unit price of sending carried out once, vs_0; and a unit price of the port for listening, vr_0, which are set by predetermined initial values.

Pattern 1:

When demands for the sending and listening are sufficiently small with respect to the port resources, it is considered that the port resources are superfluous for both the sending and listening, and, on a short-term basis, the upper limit for the listening port assignment is increased and the listening port unit price is decreased. Specifically, to attain a status that p_t>p_0 and vr_t<vr_0, p_t and vr_t are determined.

It should be noted that, on a long-term basis, the unit price of sending carried out once vs_t is also decreased. Accordingly, it is expected that the sending quantity increases, and hence p_t and vr_t are adjusted again.

Pattern 2:

When only the demand for sending exceeds the supply, namely, when the ports for sending are all in use, hence the assignment cannot be performed, and a sending request occurs, it is assumed that the port resources for listening are surplus, and a part of them is provided for the port resources for sending. Specifically, p_t is set so as to attain the relationship p_t<p_0 while the reserved quantity of listening does not exhaust the port resources for listening.

Pattern 3:

When only the demand for listening exceeds the supply, namely, when the number of reserved ports has reached the upper limit and hence the reservation request cannot be carried out, it is assumed that the port resources for sending are surplus, and a part of them is provided for the port resources for listening. Specifically, p_t is set so as to attain the relationship p_t>p_0 while the sending quantity does not exhaust the port resources for sending.

Pattern 4:

When the demands both for sending and listening exceed the supplies, the price of the port resources for sending is set constant, and hence only the port resources for listening can adjust the demand on a short-term basis. Therefore, on a short-term basis, the upper limit for the reservation of the ports for listening is decreased, and the unit price of the ports for listening is increased. Specifically, to attain a status that $p\_t < p\_0$ and $vr\_t > vr\_0$, $p\_t$ and $vr\_t$ are determined.

It should be noted that, on a long-term basis, the unit price of sending carried out once $vs\_t$ is also increased. Accordingly, it is expected that the sending quantity decreases, and $p\_t$ and $vr\_t$ are adjusted again.

On this occasion, as for how to execute the short-term processing and the long-term processing, for example, the assignment rule update unit 12 is configured to hold a predetermined number of results of the case determination based on the expected values, and when it is determined that a certain degree of the short-term processing still cannot change a status (namely, a result of the case determination), the long-term processing may be carried out.

In this way, by adjusting, on a short-term basis, the supplied quantity and the price of the ports for listening, and by adjusting also, on a long-term basis, the price of the ports for sending, the respective ratios of demand for sending and listening, and the demand for the entire port resources can be optimally adjusted. As a result, the port resources can be automatically and efficiently assigned.

Though, in the above description, the demand is constant for certain fixed time period and price, on a long-term basis, it is considered that the tendencies may gradually change. Hence, preferably, the sending quantity and the reserved quantity are always measured, and the statistics are periodically updated.

Sixth Embodiment

A description is now given of a sixth embodiment of the address translation device according to this invention. This embodiment is an example of a case in which a plurality of address translation devices are used for interconnection of networks. The previous embodiments have described examples in which the address translation device 1 operates as a single device. However, when a large-scale private network 200 and global network 100 are connected with each other, a large quantity of traffic needs to be relayed, and a single address translation device may not attain a sufficient performance.

In this case, it is conceived that a plurality of address translation devices are provided, and, to the respective address translation devices, divided parts of the space of the local endpoints are assigned. For example, address translation devices respectively dedicated to sending and listening may be prepared, and a ratio between the respective numbers of the devices may be used to adjust the distribution of the port usages. However, even in this case, when the port usage is switched, existing sessions need to be protected, and when free ports for sending become no longer available, the controls for the sending wait queue and the prioritized sending wait queue are desirable.

This invention, even in a network configuration constructed by a plurality of address translation devices, can be applied to the individual address translation devices to provide the same effect.

Figure 13:
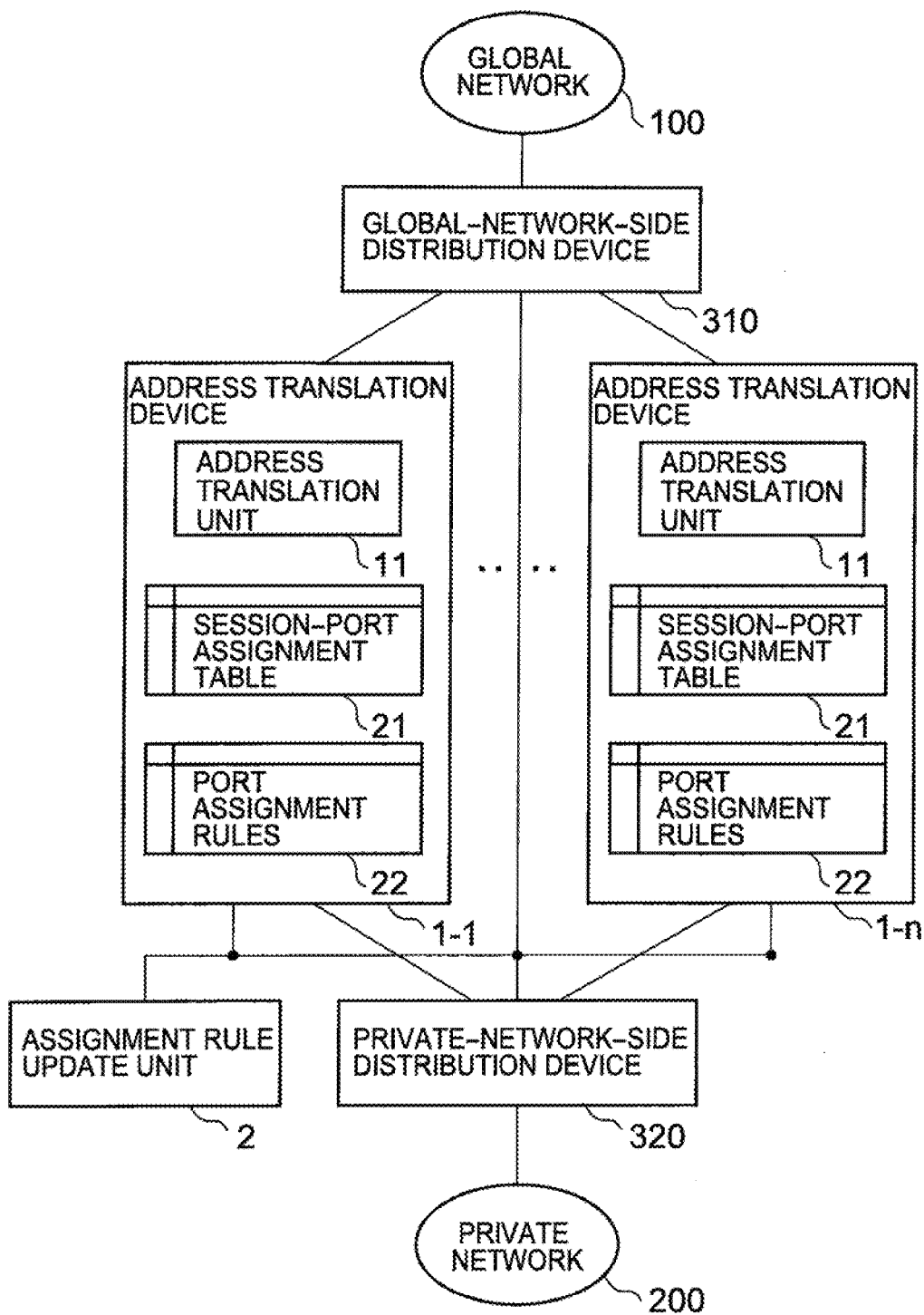
FIG. 13 is an explanatory diagram illustrating a configuration example of an address translation system provided with a plurality of address translation devices.
Figure 14:
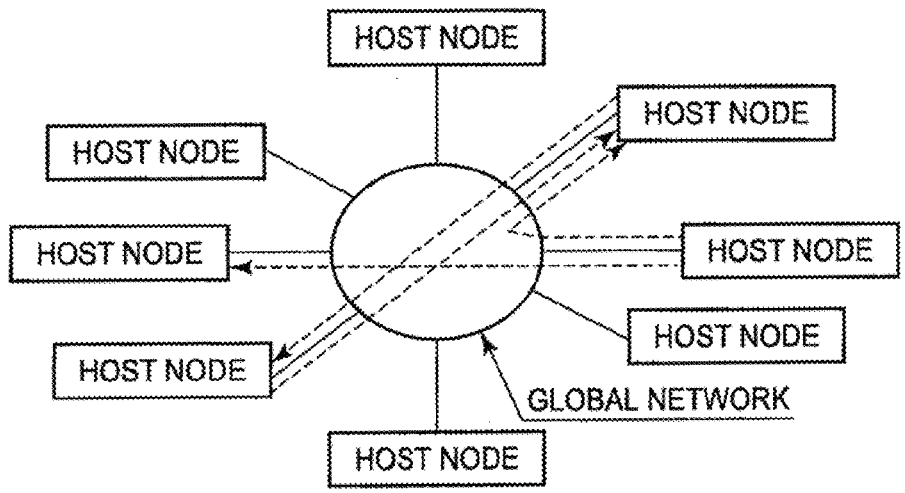
FIG. 14 is an explanatory diagram illustrating an example of a global network which is a characteristic of the configuration of the early Internet.
Figure 15:
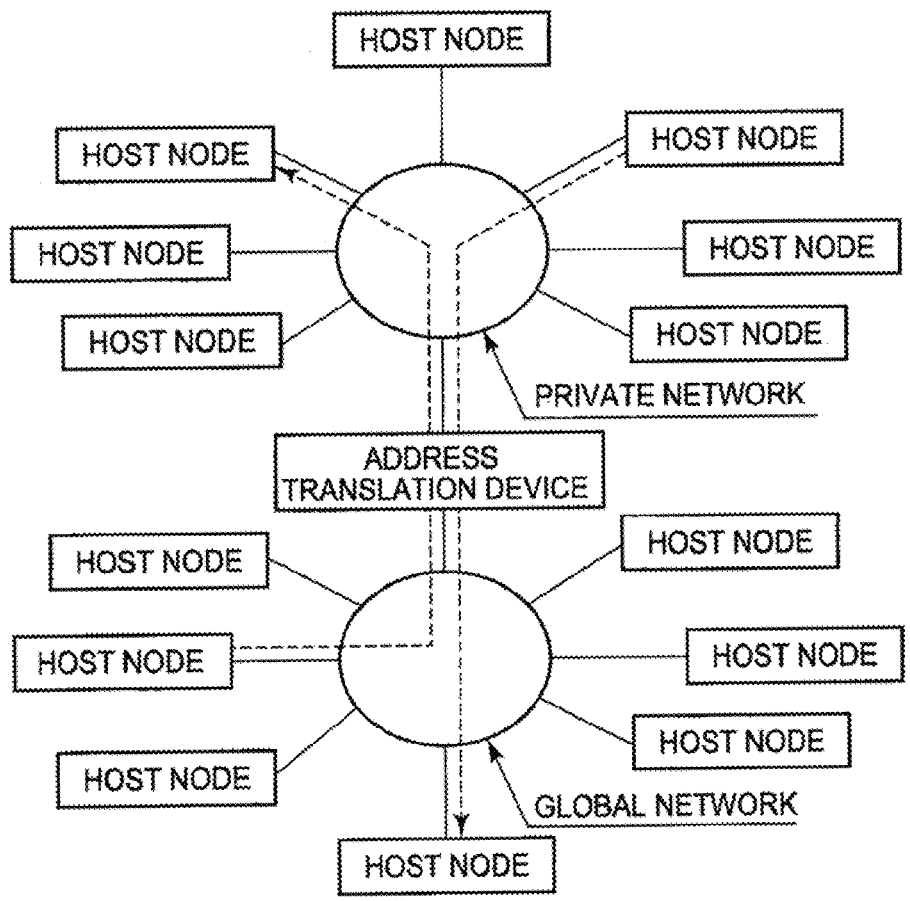
FIG. 15 is an explanatory diagram illustrating an example of an interconnection which is a characteristic of the configuration of the recent Internet.
Figure 16:
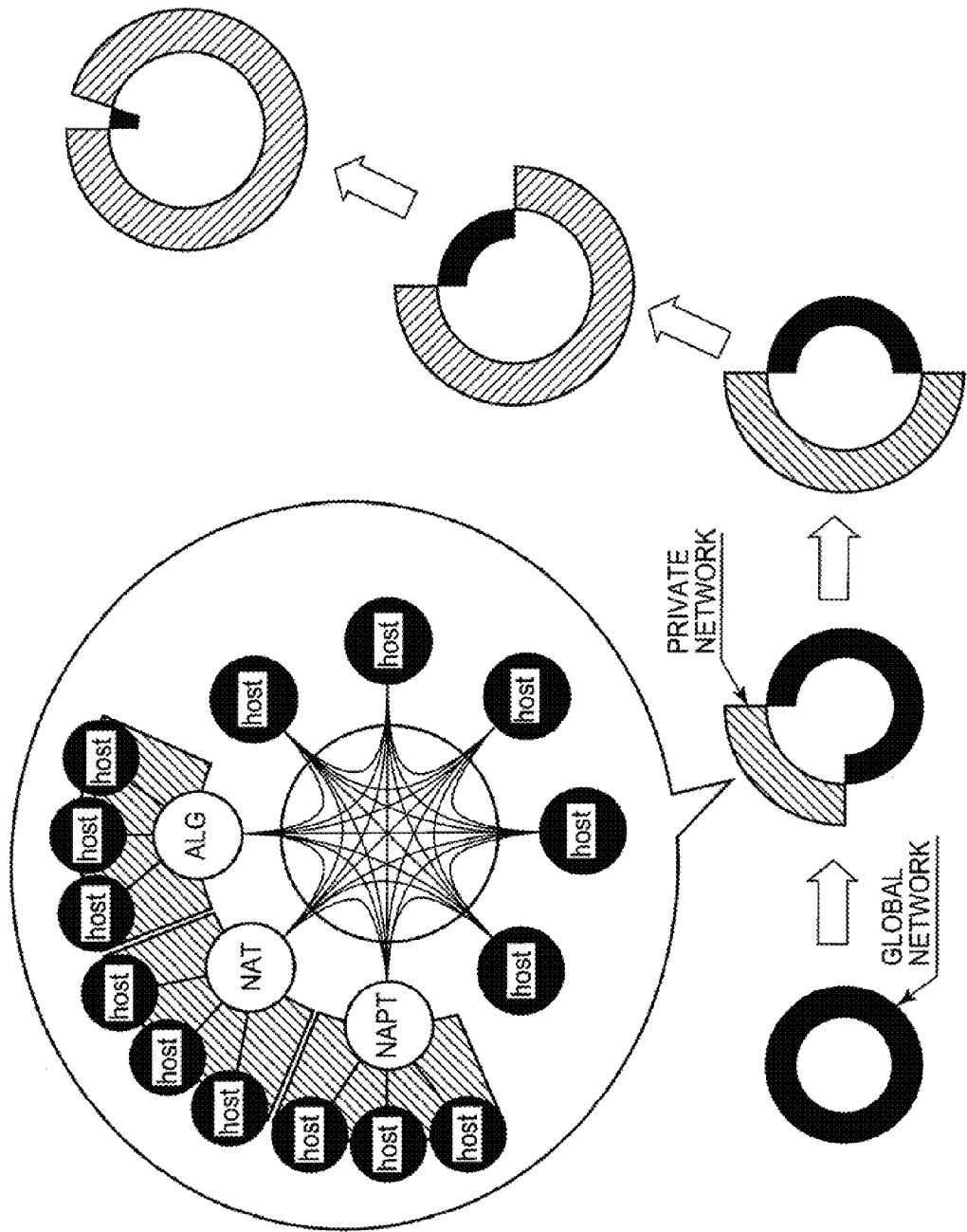
FIG. 16 is an explanatory diagram illustrating a change in the configuration of the future Internet.
Figure 17:
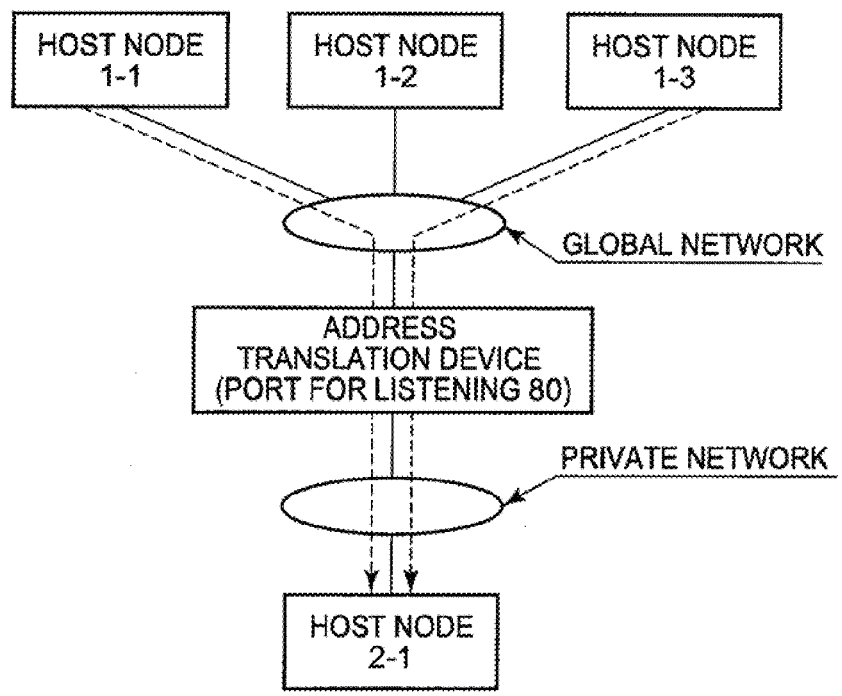
FIG. 17 is an explanatory diagram illustrating an example of a usage (usage for listening) of a port number in the address translation device.
Figure 18:
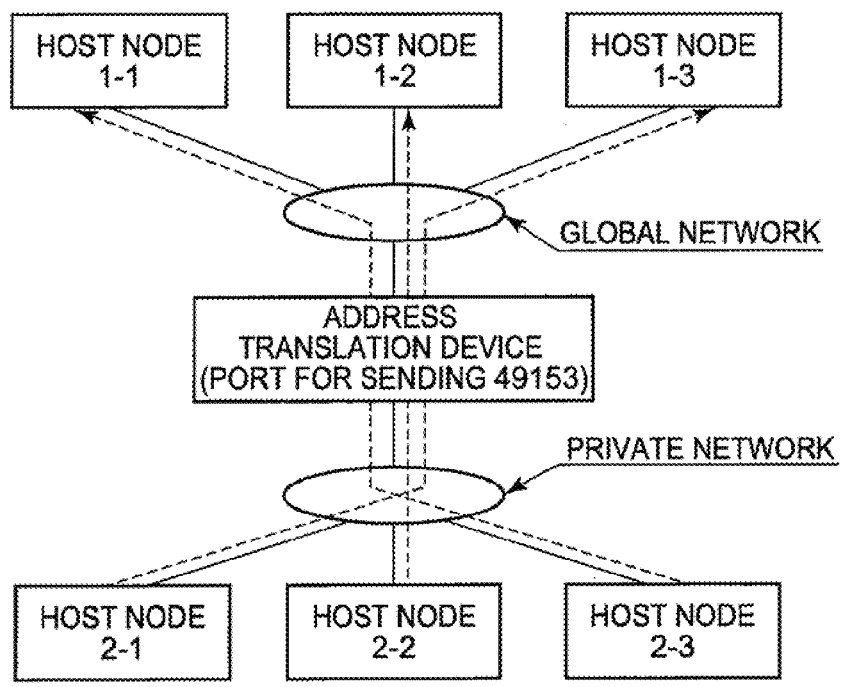
FIG. 18 is an explanatory diagram illustrating an example of a usage (usage for outbound) of a port number in an address translation device.

FIG. 13 is an explanatory diagram illustrating a configuration example of an address translation system including a plurality of address translation devices. The address translation system illustrated in FIG. 13 includes a plurality of address translation devices 1 (address translation devices 1-1 to 1-n), a global-network-side packet distribution device 310, a private-network-side packet distribution device 320, and an assignment rule update unit 2.

The address translation devices 1-1 to 1-n in this embodiment are obtained by removing, from the address translation device 1 which is the above-mentioned single device, the assignment rule update unit 12.

The packet distribution devices 310 and 320 are communication devices which have a function corresponding to that of an L4 switch, are respectively connected to the global network 100 and the private network 200, and have a function of identifying, according to distribution rules provided by the assignment rule update unit 2, based on the header information of a packet arriving from the network, a desired address translation device 1, and passing the packet to the destination address translation device 1.

The assignment rule update unit 2 divides the space of the port numbers into port numbers for sending and port numbers for listening according to predetermined procedures, and further, to the respective address translation devices 1, assigns lists of port numbers to be processed while the port usages are explicitly specified. Moreover, according to the assignment of the ports to be processed to the respective address translation devices 1, the assignment rule update unit 2 sets distribution rules to the packet distribution devices 310 and 320. Specifically, to the global-network-side packet distribution device 310, it is only necessary to set distribution rules so as to distribute, to the address translation device 1 to which a port number as a local endpoint available for listening is assigned, packets directed to the local endpoint. Moreover, to the private-network-side packet distribution device 320, distribution rules may be set so that, to the address translation devices 1 to which port numbers used as local endpoints available for sending are assigned, for example, private endpoints serving as the sending source are distributed according to the number of these address translation devices 1 so that distribution is directed to the predetermined address translation devices 1.

To the network configuration constructed by the plurality of address translation devices in this way, as an address translation system, this invention can also be applied.

In the first to sixth embodiments, for the examples of the address translation device 1 which connects the private network and the global network with each other, the methods of efficiently assigning the port resources on the global network side are described. This method may also be applied to an address translation device for connecting a network which employs address spaces different from those of the private network and a global network compliant with the IPv4.

For example, when an IPv6 network and an IPv4 global network are connected with each other, on a boundary therebetween, an address translation device such as NAT-PT or a transport relay is provided. A principal purpose of this address translation device is to remove the IPv4 header from a packet and to attach the IPv6 header, and vice versa, thereby allowing a session to pass interchangeably between the IPv4 network and the IPv6 network.

On this occasion, the IPv6 network has a sufficiently large address space, and is hence constructed as a network in which host nodes can mutually reach each other without routing through the IPv4 network. Hence, the communication between the IPv6 host nodes via the IPv4 global network is relatively infrequent, and the port resources of the address translation device are possibly never exhausted.

On the other hand, when, to a specific host node disposed on the IPv4 global network, session connections from the IPv6 network increase, there poses a problem of port exhaustion of the address translation device. In this case, by employing the method according to this invention, ports can be efficiently assigned.

Moreover, in the above-mentioned embodiments, there have been described the configurations of the address translation devices each including: a port assignment rule storage unit for storing a port assignment rule indicating port resources represented by assignable global addresses while the port resources are divided into port resources for sending from the private network and port resources for listening from the global network; a session-port assignment table storage unit for storing a session-port assignment table showing a correspondence between information indicating an existing session and information indicating the port resource represented by the global address assigned to a session endpoint of the existing session on a side of the private network; an address translation unit for translating address information of a packet received according to the correspondence between the existing session and the port resource registered in the session-port assignment table, and assigning, when a packet for opening a new session, which is not registered in the session-port assignment table, is received, the port resource to the new session according to a port usage indicated by the port assignment rule; and a port usage ratio changing unit for changing a ratio between a number of assigned ports for sending and a number of assigned ports for listening according to predetermined procedures. In the above-mentioned embodiments, the port assignment rule storage unit is realized by the port assignment rules 22 (specifically, the storage device of the address translation device 1 to which a storage area is assigned as the port assignment rules 22). Moreover, the session-port assignment table storage unit is realized by the session-port assignment table 21 (specifically, the storage device of the address translation device 1 to which a storage area is assigned as the session-port assignment table 21). Moreover, the address translation unit is realized by the address translation unit 11. Moreover, the port usage ratio changing unit is realized by the assignment rule update unit 12.

Moreover, the above-mentioned embodiments have described the configuration in which the port usage ratio changing unit changes the ratio between the number of the assigned ports for sending and the number of the assigned ports for listening by changing the port assignment rule while the correspondence between the existing session and the port resource is held in the session-port assignment table.

Moreover, the above-mentioned embodiments have described the configuration in which the port usage ratio changing unit changes a ratio of the port usage based on a fluctuation of a demand for the port resources for each predetermined time period, which is estimated from a past usage quantity. This configuration enables control for attaining an optimal assignment ratio of the port usages.

Moreover, the above-mentioned embodiments have described the configuration in which the address translation device further includes: a user identification information storage unit for storing user identification information for identifying a user for each session endpoint on the side of the private network; and a usage record storage unit for storing a usage record to be used for a charging mechanism for the each user, and the address translation unit includes a sending control unit for recording, when a port for sending is assigned to the new session, a usage record relating to sending for the user identified by the information on the session endpoint represented by the packet which has opened the new session. In the above-mentioned embodiments, the user identification information storage unit is realized by the sending port assignment rules 222 containing the user identification information (specifically, the storage device of the address translation device 1 to which a storage area is assigned as the sending port assignment rules 222). Moreover, the usage record storage unit is realized by the sending charge unit 23. Moreover, the sending control unit is realized by the sending control unit 114 according to the second embodiment. With this configuration, upon the sending processing, a sending user can be identified, and then can be charged, thereby preventing wasteful use of the port resources.

Moreover, the above-mentioned embodiments have described the configuration in which the port usage ratio changing unit changes the ratio of the port usage and a port resource usage unit price for each of the port usages in the charge mechanism based on a demanded quantity of the port resources for the each predetermined time period, which is estimated from the past usage quantity and an actual supplied quantity thereof. The port usage ratio changing unit according to the above-mentioned embodiments is realized by the assignment rule update unit 12 according to the fifth embodiment. With this configuration, the ratio of the demand respectively for sending and listening, and the demand for the entire port resources can be optimally adjusted. As a result, the port resources can be more efficiently assigned.

Moreover, the above-mentioned embodiments have described the configuration in which the address translation device further includes a sending wait queue for temporarily storing a packet waiting for assignment of a port for sending, and the address translation unit includes a sending control unit for holding, when the packet for opening the new session is received, and the port for sending cannot be assigned due to no free port for sending, the packet in the sending wait queue, sequentially checking, when a free port for sending becomes available, the packets held in the sending wait queue, and assigning, when the port for sending can be assigned to the new session which the packet attempts to open, the port for sending. The sending wait queue according to the above-mentioned embodiments is realized by the sending wait queue 24. Moreover, the sending control unit is realized by the sending control unit 114 according to the third embodiment. With this configuration, it is possible to equally carry out the sending processing. For example, even when a large quantity of sending simultaneously arrives, and ports for sending are not sufficiently secured, the ports for sending may be equally distributed.

Moreover, the above-mentioned embodiments have described the configuration in which the address translation device further includes a plurality of the sending wait queues corresponding to different priorities, and the sending control unit determines, upon holding the packet in one of the plurality of the sending wait queues, a priority of a user identified based on the session endpoint on the side of the private network indicated by the packet, holds the packet in the one of the plurality of the sending wait queues corresponding to the determined priority, and attempts to assign, when the free port for sending becomes available, the port for sending to one of the plurality of the sending wait queues in a descending order of the priority. The sending wait queue according to the above-mentioned embodiments is realized by the sending wait queue 24 according to the fourth embodiment. Moreover, the sending control unit is realized by the sending control unit 114 according to the fourth embodiment. With this configuration, it is possible to increase, by operationally associating with the charge function, for example, the degree of freedom of the distribution of the port resources.

Moreover, the above-mentioned embodiments have described the configuration in which the address translation unit further includes a session monitor tinier unit for determining an end of a session for each entry of the session-port assignment table according to time keeping processing of a timer, which is started according to a predetermined condition. The session monitor timer unit according to the above-mentioned embodiments is realized by the session monitor timer unit 115.

Moreover, the above-mentioned embodiments have described the configuration of an address translation device disposed on a boundary between two packet exchange networks in which an address space of one network (P) contains an address space of another network (G), or mapping exists from the address space of the one network (P) to the address space of the another network (G), and mutually connecting the two packet exchange networks, the address translation device including: a port assignment rule storage unit for storing a port assignment rule indicating port resources in a port number space of a transport layer on a side of the another network (G), which can be assigned by the address translation device, while the port resources are divided into port resources for sending used for opening a session from the one network (P) to the another network (G) and port resources for listening used for opening a session from the another network (G) to the one network (P); a session-port assignment table storage unit for storing a session-port assignment table showing a correspondence between information indicating a session endpoint of an existing session and information indicating the port resource in the port number space of the transport layer on the side of the another network (G), which is assigned to a session to the session endpoint of the existing session on a side of the one network (P); an address translation unit for translating address information of a packet received according to the correspondence between the existing session and the port resource registered in the session-port assignment table, and assigning, when a packet for opening a new session, which is not registered in the session-port assignment table, is received, the port resource to the new session according to a port usage indicated by the port assignment rule; and a port usage ratio changing unit for changing a ratio between a number of assigned ports for sending and a number of assigned ports for listening according to predetermined procedures. It should be noted that the relationship between the two packet exchange networks in which the address space of the one network (P) contains the address space of the another network (G), or the mapping exists from the address space of the network (P) to the address space of the network (G) is a relationship between an IPv6 network (corresponding to the network (P)) and an IPv4 global network (corresponding to the network (G)), for example. With this configuration, it is possible to efficiently use resources not only for interconnection between the global network and the private network, but also for network connection with possible exhaustion of global address resources in an interconnection between networks having different address spaces.

Moreover, the above-mentioned embodiments have described the configuration of an address translation system including one or more address translation devices each for carrying out address translation to relay a packet; and a port assignment management device for partially or entirely assigning port resources represented by global addresses, which can be assigned by the address translation system, to the one or more address translation devices while a usage is specified, in which: each of the one or more address translation devices includes: a session-port assignment table storage unit for storing a session-port assignment table showing a correspondence between information indicating a session endpoint of an existing session and information indicating the port resource represented by the global address assigned to the session endpoint of the existing session on a side of the private network; and an address translation unit for translating address information of a packet received according to the correspondence between the existing session and the port resource registered in the session-port assignment table, and assigning, when a packet for opening a new session, which is not registered in the session-port assignment table, is received, to the new session, the port resource assigned by the port assignment management device according to the usage thereof; and the port assignment management device includes a port usage ratio changing unit for changing a ratio of a number of ports to be assigned to the each of the one or more address translation devices according to predetermined procedures. The port assignment management device according to the above-mentioned embodiments is realized by an information processing device including the assignment rule update unit 2. Moreover, the address translation devices are realized by the address translation devices 1-1 to 1-n. With this configuration, this invention may be applied to a case in which, when a large-scale private network and global network are connected with each other, a single device does not exhibit a sufficient performance, and hence the device is configured by the plurality of address translation devices. For example, address translation devices respectively dedicated to sending and listening may be provided, and the ratio between the respective numbers of the devices may be used to adjust the port usages.

INDUSTRIAL APPLICABILITY

This invention may be applied to the address translation device having an address translation function for interconnection of networks having address spaces different from each other. For example, this invention may preferably be applied to a router, a switch, and a session relay device having the NAPT function of connecting an IPv4 global network and a private network with each other, and of dynamically assigning port numbers, and a transport relay function. Moreover, for example, this invention may preferably be applied to devices of the same type having the NAPT-PT function of connecting an IPv6 network and an IPv4 network with each other and the transport relay function.

The invention claimed is:

1. An address translation device disposed on a boundary between a private network and a global network respectively having different address spaces, and mutually connecting the private network and the global network, the address translation device comprising:
   a port assignment rule storage unit adapted to store a port assignment rule which defines port resources associated with a global address of the address translation device by dividing the port resources between port resources for sending from the private network and port resources for listening from the global network;
   a session-port assignment table storage unit adapted to store a session-port assignment table showing a correspondence between information indicating an existing session and information indicating the port resource associated with the global address and assigned to a session endpoint of the existing session on a side of the private network;

in response to reception of a packet for an existing session in the session-port assignment table, an address translation unit adapted to translate address information of a packet received according to the correspondence between the existing session and the port resource registered in the session-port assignment table, and in response to reception of a packet for opening a new session which is not registered in the session-port assignment table, adapted to translate address information of the packet by making an entry in the session-port assignment table of a correspondence between the new session and a port resource thereof by assigning, the port resource to the new session according to the port assignment rule; and a port assignment rule update unit operable to change in the port assignment rule a port ratio between a number of assigned ports for sending and a number of assigned ports for listening according to predetermined procedures, wherein the port resource comprises a set of an address and a port number used by a protocol in a transport layer and assigned to a session.

2. An address translation device according to claim 1, wherein the port ratio between the number of the assigned ports for sending and the number of the assigned ports for listening is changed while the correspondence between the existing session and the port resource remains unchanged in the session-port assignment table.

3. An address translation device according to claim 1, wherein the port ratio between the number of the assigned ports for sending and the number of the assigned ports for listening is changed based on a fluctuation of a demand for the port resources for each predetermined time period, which is estimated from a past usage quantity.

4. An address translation device according to claim 1, further comprising:

a user identification information storage unit for storing user identification information for identifying a user for each session endpoint on the side of the private network; and a usage record storage unit for storing a usage record to be used for a charging mechanism for the each user, wherein the address translation unit comprises a sending control unit operable to record, when a port for sending is assigned to the new session, a usage record relating to sending for the user identified by the information on the session endpoint represented by the packet which has opened the new session.

5. An address translation device according to claim 4, wherein the port assignment rule update unit changes the port ratio between the number of the assigned ports for sending and the number of the assigned ports for listening and a port resource usage unit price for each of port usages in the charge mechanism based on a demanded quantity of the port resources for the each predetermined time period, which is estimated from the past usage quantity and an actual supplied quantity thereof.

6. An address translation device according to claim 1, further comprising a sending wait queue for temporarily storing a packet waiting for assignment of a port for sending, wherein the address translation unit comprises a sending control unit for holding, when the packet for opening the new session is received, and the port for sending cannot be assigned due to no free port for sending, the packet in the sending wait queue, sequentially checking, when a free port for sending becomes available, the packets held in the sending wait queue, and assigning, when the port for sending can be assigned to the new session which the packet attempts to open, the port for sending.

7. An address translation device according to claim 6, further comprising a plurality of the sending wait queues corresponding to different priorities, wherein the sending control unit determines, upon holding the packet in one of the plurality of the sending wait queues, a priority of a user identified based on the session endpoint on the side of the private network indicated by the packet, holds the packet in the one of the plurality of the sending wait queues corresponding to the determined priority, and attempts to assign, when the free port for sending becomes available, the port for sending to one of the plurality of the sending wait queues in a descending order of the priority.

8. An address translation device according to claim 1, wherein the address translation unit further comprises a session monitor timer unit for determining an end of a session for each entry of the session-port assignment table according to time keeping processing of a timer, which is started according to a predetermined condition.

9. An address translation device disposed on a boundary between two packet exchange networks in which an address space of one network (P) contains an address space of another network (G), or mapping exists from the address space of the one network (P) to the address space of the another network (G), and mutually connecting the two packet exchange networks, the address translation device comprising:

a port assignment rule storage unit adapted to store a port assignment rule defining port resources in a port number space of a transport layer on a side of the another network (G), which can be assigned by the address translation device, while the port resources are divided into port resources for sending used for opening a session from the one network (P) to the another network (G) and port resources for listening used for opening a session from the another network (G) to the one network (P);

a session-port assignment table storage unit adapted to store f a session-port assignment table showing a correspondence between information indicating an existing session and information indicating the port resource in the port number space of the transport layer on the side of the another network (G), which is assigned to a session endpoint of the existing session on a side of the one network (P);

in response to reception of a packet for an existing session in the session-port assignment table, an address translation unit adapted to translate address information of a packet received according to the correspondence between the existing session and the port resource registered in the session-port assignment table, and in response to reception of a packet for opening a new session which is not registered in the session-port assignment table, adapted to translate address information of the packet by making an entry in the session-port assignment table of a correspondence between the new session and a port resource thereof by assigning, the port resource to the new session according to the port assignment rule; and a port assignment rule update unit operable to change in the port assignment rule a port ratio between a number of assigned ports for sending and a number of assigned ports for listening according to predetermined procedures.

wherein the port resource comprises a set of an address and a port number used by a protocol in a transport layer and assigned to a session.

10. A control method for a device disposed on a boundary between a private network and a global network respectively having different address spaces, and mutually connecting the private network and the global network, the control method comprising:

> managing, as a port assignment rule, port resources associated with a global address while the port resources are divided into port resources for sending from the private network and port resources for listening from the global network;
>
> managing in a session-port assignment table a correspondence between information indicating an existing session and information indicating the port resource associated with the global address and assigned to a session endpoint of the existing session on a side of the private network;
>
> in response to reception of a packet for an existing session in the session-port assignment table, translating, according to the correspondence between the existing session and the port resource registered in the session-port assignment table, address information of a received packet, and in response to reception of a packet for opening a new session which is not registered in the session-port assignment table, translating address information of the packet by making an entry in the session-port assignment table of a correspondence between the new session and a port resource thereof by assigning, the port resource to the new session according to the port assignment rule; and
>
> changing, in response to an instruction to change a port ratio between a number of assigned ports for sending and a number of assigned ports for listening, the port assignment rule while the correspondence between the existing session and the port resource is held,
>
> wherein the port resource comprises a set of an address and a port number used by a protocol in a transport layer and assigned to a session.

11. A non-transitory computer readable storage device for storing a control program for a device disposed on a boundary between a private network and a global network respectively having different address spaces, and mutually connecting the private network and the global network, the control program causing a computer to execute a control method, the control method comprising:

> managing, as a port assignment rule, port resources associated with a global address while the port resources are divided into port resources for sending from the private network and port resources for listening from the global network,
>
> and managing in a session-port assignment table a correspondence between information indicating an existing session and information indicating the port resource associated with the global address and assigned to a session endpoint of the existing session on a side of the private network
>
> in response to reception of a packet for an existing session in the session-port assignment table, translating, according to the correspondence between the existing session and the port resource registered in the session-port assignment table, address information of a received packet, and in response to reception of a packet for opening a new session which is not registered in the session-port assignment table, translating address information of the packet by making an entry in the session-port assignment by table by assigning, the port resource to the new session according to the port assignment rule; and
>
> changing, in response to an instruction to change a ratio between a number of assigned ports for sending and a number of assigned ports for listening, the port assignment rule while the correspondence between the existing session and the port resource is held.

wherein the port resource comprises a set of an address and a port number used by a protocol in a transport layer and assigned to a session.

* * * * *